(12) United States Patent
Eguchi

(10) Patent No.: US 11,041,964 B2
(45) Date of Patent: Jun. 22, 2021

(54) RADIATION MONITORING EQUIPMENT

(71) Applicant: Mitsubishi Electric Corporation, Tokyo (JP)

(72) Inventor: Kazuhiro Eguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 302 days.

(21) Appl. No.: 15/370,678

(22) Filed: Dec. 6, 2016

(65) Prior Publication Data

US 2018/0038965 A1    Feb. 8, 2018

(30) Foreign Application Priority Data

Aug. 5, 2016   (JP) .............................. JP2016-154200

(51) Int. Cl.
    *G01T 1/17*          (2006.01)
    *G01T 1/185*        (2006.01)
    (Continued)

(52) U.S. Cl.
    CPC ................ *G01T 1/17* (2013.01); *G01T 1/023* (2013.01); *G01T 1/185* (2013.01); *G01T 1/171* (2013.01);
    (Continued)

(58) Field of Classification Search
None
See application file for complete search history.

(56) References Cited

U.S. PATENT DOCUMENTS 4,186,307 A *   1/1980   Tanaka ...................... G01T 1/20
                                                      250/363.02
4,281,382 A *   7/1981   Knoll ..................... G01T 1/1642
                                                        128/922

(Continued)

FOREIGN PATENT DOCUMENTS

GB          1575148 A   *   9/1980   ........... G01R 21/133
JP         61-083967 A       4/1986
(Continued)

OTHER PUBLICATIONS

Machine Translation for JP2001215279 (Year: 2001).*

(Continued)

*Primary Examiner* — Catherine T. Rastovski
*Assistant Examiner* — Leonard S Liang
(74) *Attorney, Agent, or Firm* — Buchanan Ingersoll & Rooney PC

(57) ABSTRACT

The operation unit of radiation monitoring equipment reads in a real countable number (this time) and a cumulated countable number (previous time) in a every operational cycle, and judges whether the real countable number (this time) is within a permissible range, if the real countable number (this time) is judged to be within the permissible range, it is judged whether a number of times deviated from the permissible range is equal to zero or not, if the number of times deviated from the permissible range is judged to be equal to zero, a regular processing is performed, if the real countable number (this time) is judged to be out of a permissible range, 1 is added to the number of times deviated from the permissible range and further it is judged whether the added number of times deviated from the permissible range is equal to 1 or not.

6 Claims, 19 Drawing Sheets

(51) Int. Cl.
*G01T 1/02* (2006.01)
*G01T 1/20* (2006.01)
*G01T 1/208* (2006.01)

(52) U.S. Cl.
CPC ............ *G01T 1/20* (2013.01); *G01T 1/208* (2013.01); *Y02E 30/30* (2013.01)

(56) References Cited

U.S. PATENT DOCUMENTS

| | | | | |
|---|---|---|---|---|
| 4,301,367 | A * | 11/1981 | Hsu | G01T 1/24 250/370.07 |
| 4,381,450 | A * | 4/1983 | Cappelli | G01T 1/026 250/370.07 |
| 4,591,984 | A * | 5/1986 | Mori | G01T 1/171 250/363.02 |
| 4,880,981 | A * | 11/1989 | Johnston | G01T 1/203 250/369 |
| 5,012,097 | A * | 4/1991 | Oda | G01J 1/42 250/227.11 |
| 5,113,077 | A * | 5/1992 | Shimizu | G01T 1/2985 250/370.09 |
| 5,477,050 | A * | 12/1995 | Kronenberg | G01T 1/026 250/336.1 |
| 5,650,616 | A * | 7/1997 | Iketaki | H01J 49/142 250/288 |
| 6,163,029 | A * | 12/2000 | Yamada | G01T 1/2018 250/370.01 |
| 6,181,761 | B1 * | 1/2001 | Izumi | G21C 17/10 376/254 |
| 6,229,377 | B1 * | 5/2001 | Hoggan | G01T 1/17 327/408 |
| 8,384,004 | B1 * | 2/2013 | Rowland | H01J 47/12 250/207 |
| 9,229,119 | B1 * | 1/2016 | Taguchi | G01T 1/185 |
| 9,423,512 | B2 * | 8/2016 | Sato | H04N 5/32 |
| 9,494,695 | B2 * | 11/2016 | Eguchi | G21C 17/002 |
| 10,422,896 | B1 * | 9/2019 | Ianakiev | G01T 3/008 |
| 10,551,721 | B2 * | 2/2020 | Sato | A61B 6/542 |
| 2002/0117627 | A1 * | 8/2002 | Jimbo | G01T 7/00 250/370.13 |
| 2002/0125999 | A1 * | 9/2002 | Cho | G01T 7/00 340/286.02 |
| 2002/0146087 | A1 * | 10/2002 | Izumi | G01T 1/17 376/245 |
| 2002/0149396 | A1 * | 10/2002 | Mizuhara | G01J 1/44 327/1 |
| 2004/0200967 | A1 * | 10/2004 | Russell | G01T 1/026 250/370.01 |
| 2008/0243404 | A1 * | 10/2008 | Banhegyesi | G01R 22/065 702/61 |
| 2009/0140159 | A1 * | 6/2009 | Tomita | G01T 1/17 250/394 |
| 2010/0102243 | A1 * | 4/2010 | Sakai | G01T 1/247 250/395 |
| 2011/0113611 | A1 * | 5/2011 | Tonami | G01T 1/1644 29/428 |
| 2011/0144945 | A1 * | 6/2011 | Hayashi | G01T 1/17 702/183 |
| 2013/0146767 | A1 * | 6/2013 | Seino | G01T 1/17 250/336.1 |
| 2013/0248721 | A1 * | 9/2013 | Williams | G01T 1/105 250/362 |
| 2013/0275087 | A1 * | 10/2013 | Scott | G01T 1/17 702/189 |
| 2013/0284926 | A1 * | 10/2013 | Aiba | G01T 1/17 250/336.1 |
| 2013/0327940 | A1 * | 12/2013 | Nagai | G01T 1/18 250/336.1 |
| 2014/0114596 | A1 * | 4/2014 | Kobayashi | G01T 1/17 702/64 |
| 2014/0172374 | A1 * | 6/2014 | Brady | G01N 21/3581 702/189 |
| 2014/0183359 | A1 * | 7/2014 | Tamaru | G01T 1/15 250/336.1 |
| 2014/0188418 | A1 * | 7/2014 | Inoue | G01T 1/171 702/66 |
| 2014/0203182 | A1 * | 7/2014 | Tsukiyama | H04N 5/32 250/370.08 |
| 2014/0312228 | A1 * | 10/2014 | Moteki | G01T 1/02 250/336.1 |
| 2015/0006112 | A1 * | 1/2015 | Gordon | G01T 1/178 702/189 |
| 2015/0017092 | A1 * | 1/2015 | Costes | G01N 21/253 424/1.11 |
| 2015/0025852 | A1 * | 1/2015 | Fukuchi | G01T 1/24 702/189 |
| 2015/0198723 | A1 * | 7/2015 | Katayama | G01T 7/005 250/336.1 |
| 2016/0109525 | A1 * | 4/2016 | Chau | G01R 31/3679 324/434 |
| 2016/0109586 | A1 * | 4/2016 | Eguchi | G01T 1/02 250/361 R |
| 2016/0170031 | A1 * | 6/2016 | Feller | G01S 19/14 342/357.34 |
| 2016/0231436 | A1 * | 8/2016 | Tanaka | G01T 1/36 |
| 2016/0238717 | A1 * | 8/2016 | Abraham | G01T 1/17 |
| 2016/0252626 | A1 * | 9/2016 | Eguchi | G21C 17/003 250/336.1 |
| 2016/0266054 | A1 * | 9/2016 | Cao | A61B 6/4241 |
| 2016/0356897 | A1 * | 12/2016 | Aoki | G01T 1/202 |
| 2017/0160404 | A1 * | 6/2017 | Moteki | G01T 1/16 |
| 2017/0280542 | A1 * | 9/2017 | Aiba | G01T 1/17 |
| 2018/0356537 | A1 * | 12/2018 | Katayama | G01T 1/167 |
| 2019/0154847 | A1 * | 5/2019 | Ohashi | G01T 1/17 |

FOREIGN PATENT DOCUMENTS

| | | | | |
|---|---|---|---|---|
| JP | 03195991 | A | * | 8/1991 |
| JP | 10239440 | A | * | 9/1998 |
| JP | H10-239440 | A | | 9/1998 |
| JP | 2000-258537 | A | | 9/2000 |
| JP | 2001215279 | A | * | 8/2001 |
| JP | 2003-028963 | A | | 1/2003 |
| JP | 2003-057354 | A | | 2/2003 |
| JP | 2004-294193 | A | | 10/2004 |
| JP | 2004294193 | A | * | 10/2004 |
| JP | 2004333326 | A | * | 11/2004 |
| JP | 2006-098081 | A | | 4/2006 |
| JP | 2007017374 | A | * | 1/2007 |
| JP | 2007071760 | A | * | 3/2007 |
| JP | 2007183118 | A | * | 7/2007 |
| JP | 2007187682 | A | * | 7/2007 |
| JP | 2008215907 | A | * | 9/2008 |
| JP | 2011133454 | A | * | 7/2011 |
| JP | 2013072675 | A | * | 4/2013 |
| JP | 2013088266 | A | * | 5/2013 |
| JP | 2013113648 | A | * | 6/2013 |
| JP | 2013228285 | A | * | 11/2013 | ............ G01T 1/17 |
| JP | 2014-112052 | A | | 6/2014 |
| JP | 2014112052 | A | * | 6/2014 |
| JP | 2014112052 | A | * | 6/2014 |
| JP | 2014219362 | A | * | 11/2014 |
| JP | 2014235014 | A | * | 12/2014 |
| JP | 2016114446 | A | * | 6/2016 | ............ G01T 1/185 |
| JP | 2018004398 | A | * | 1/2018 |

OTHER PUBLICATIONS

Machine Translation for JP2004294193 (Year: 2004).*
Machine Translation for JP2004333326 (Year: 2004).*
Machine Translation for JP2007017374 (Year: 2007).*
Machine Translation for JP2007183118 (Year: 2007).*
Machine Translation for JP2007187682 (Year: 2007).*
Machine Translation for JP2008215907 (Year: 2008).*
Machine Translation for JP2011133454 (Year: 2011).*
Machine Translation for JP2013072675 (Year: 2013).*
Machine Translation for JP2013088266 (Year: 2013).*
Machine Translation for JP2013113648 (Year: 2013).*

(56) References Cited

OTHER PUBLICATIONS

Machine Translation for JP2014112052 (Year: 2014).*
Machine Translation for JP20140235014 (Year: 2014).*
Machine Translation for JP2018004398 (Year: 2018).*
Machine Translation for JPH03195991 (Year: 1991).*
Machine Translation for JP03195991A (Year: 1991).*
Machine Translation for JP10239440A (Year: 1998).*
Office Action (Notice of Reasons for Refusal) dated Aug. 20, 2019, by the Japanese Patent Office in corresponding Japanese Patent Application No. 2016-154200 and English translation of the Office Action. (8 pages).

* cited by examiner

RADIATION MONITORING EQUIPMENT

FIELD OF THE INVENTION

The present invention relates to radiation monitoring equipment, and in particular, to the radiation monitoring equipment which measures a dose rate and the like, by detecting a current signal outputted from a radiation detector.

BACKGROUND

In order to measure a dose rate and others in the living space, radiation monitoring equipment is installed around a nuclear power plant, a nuclear fuel reprocessing plant, an institution for radiation application, their affiliated facilities and the like (see Patent Documents 1-6, for example). The radiation monitoring equipment needs to measure dose rates in a wide range, from the normal radiation level to the radiation level supposing an accident, with sufficient accuracy. In order to cover the current in a minute quantity and in a wide range, an ion chamber, for example, is used for the radiation detector of the radiation monitoring equipment. If radiation acts on the ion chamber of the radiation detector, a very small electric current with a broad range, on the order of from $10^{-14}$ A (Ampere) to $10^{-7}$ A, will be generated.

As for the radiation monitoring equipment which measures such a very small electric current, a current measurement means (operational amplifier) includes a capacitor which is connected between an inverting input terminal and an output terminal. Electric charge integration is carried on the input current which is supplied from the current measurement means of the radiation monitoring equipment, and the current is changed into voltage. When the voltage exceeds a fixed voltage, the current measurement means discharges the current automatically. Thereby, a saw-tooth wavelike pulse is generated repeatedly. The measurement part of the radiation monitoring equipment counts the number of the saw-tooth wavelike pulses within a set-upped period, and obtains a count. When the set-upped period is over, the measurement part measures the voltage of a saw-tooth wavelike pulse which is smaller than one pulse and obtains a voltage value. The measurement part of the radiation monitoring equipment has measured a very small electric current based on both of the count and the voltage value (see Patent Document 1, for example).

As mentioned above, this kind of radiation monitoring is treating a very small electric current. Since special consideration is required to a noise, the radiation monitoring equipment which is equipped with a noise rejection means is developed. The noise rejection means of the radiation monitoring equipment puts the measured values in a chronological order which are measured at a constant frequency. Thereby, an up-dated row of measured values is always created. The noise rejection means calculates a moving average of a fixed period from the row of measured values, which includes measured vales from a latest value to a previous value in the past. When the latest measured value is unusual, the noise rejection means eliminates it and performs an operation of moving averaging.

As a representative example of abnormality in measured values, the static electricity noise current in the apparatus can be mentioned. In the ion chamber, a high voltage line which supplies a high voltage as a bias voltage is arranged. This high voltage line is in touch with a common 0V through an insulator. Attributing to the insulation fall by moisture absorption or rise in temperature or the like, an electric charge is accumulated near the 0V contact part. When the insulator cannot bear the accumulation of charges, an electric discharge occurs, and at a next step a charge of current proceeds. In the ion chamber, the charge and discharge is repeated with an interval. If the condition for discharging is eased, the phenomenon in which the ion chamber returns to a normal state has happened.

Because the electric charge of discharge is offset by the electric charge of charge, a noise appears in sight. For example, the noise is in a shape where a mountain is overlapped at the plus side of a saw-tooth wavelike pulse, as a single shot. This mountain does not affect the basic shape of a saw-tooth wavelike pulse. For this reason, measurement is not affected, if the timing between the voltage measurement of a saw-tooth wavelike pulse and the noise invasion is out of synchronization. When the timing is in synchronization, unusual data are eliminated from the data for measurement (see Patent Document 2, for reference).

CITATION LIST

Patent Literature

Patent Documents 1: JP S61-83967 A
Patent Documents 2: JP 2006-98081 A
Patent Documents 3: JP 2000-258537 A
Patent Documents 4: JP 2003-28963 A
Patent Documents 5: JP 2004-294193 A

SUMMARY OF THE INVENTION

Technical Problem

Many of the radiation monitoring devices are constituted as mentioned above. In other words, the change in readings by the noise is prevented by eliminating the measurement data, in which a voltage sudden change by a noise current is overlapped on the fundamental wave form of a saw-tooth voltage based on a current signal. During the noise continuing period, the measurement data which contain noises are eliminated. After that, there is a period when noises are in disappearance and data used for the moving average are small in number. The moving average during the noise continuing period becomes large in the statistical variation of radiation and affects the accuracy in measurement. Moreover, when the data at the time of missing measurement are compensated by the standard data, exact measurement cannot be recovered, until the data at the time of missing measurement disappear from the moving average.

This invention is made to solve the subject pointed out in the above mentioned radiation monitoring equipment. The object of the invention is to obtain the radiation monitoring equipment which has high reliability and is capable of wide range measurement with no substantial influence from the noise.

Solution to Problem

Radiation monitoring equipment according to the present invention includes; a radiation detector outputting a current signal when a radiation is incident thereon, a first conversion unit converting the current signal outputted from the radiation detector into a voltage signal and forming a rectangular wave pulse based on the voltage signal, a second conversion unit sampling the voltage signal converted in the first conversion unit and outputting a digital voltage data, a calculation unit counting a number of rectangular wave pulses formed in the first conversion unit, an operation unit calculating a cumulated count from the digital voltage data outputted from the second conversion unit and the number of rectangular wave pulses outputted from the calculation unit, and obtaining a real count (this time) from a difference of a cumulated count (this time) at a this time operation cycle and a cumulated count (previous time) at a previous time operation cycle and memorizing the real count (this time) and a display unit displaying operational results carried out in the operation unit; wherein the calculation unit reads in a real count (this time) and a cumulated count (previous time) at every operation cycle, the calculation unit judges whether the real count (this time) which is read in is within a permissible range or not, if the calculation unit judges that the real count (this time) is within the permissible range, the calculation unit judges whether a number of times deviated from the permissible range is zero or not, if the calculation unit judges that the number of times deviated from the permissible range is zero, the calculation unit performs a regular processing, if the calculation unit judges that the real count (this time) is out of the permissible range, the calculation unit adds 1 to the number of times deviated from the permissible range and further judges whether an added number of times deviated from the permissible range is equal to 1 or not, if the calculation unit judges that the added number of times deviated from the permissible range is equal to 1, the calculation unit memorizes the cumulated count (previous time) as a cumulated count just before the deviation of real count from the permissible range, and further performs a first noise processing, if the calculation unit judges that the added number of times deviated from the permissible range is not equal to 1, the calculation unit judges whether the added number of times deviated from the permissible range is within a permissible number of times or not, if the calculation unit judges that the number of times deviated from the permissible range is out of the permissible number of times, the calculation unit performs the regular processing, if the calculation unit judges that the number of times deviated from the permissible range is within the permissible number of times, the calculation unit performs the first processing, and; further wherein the regular processing includes; a step for calculating a moving average counting rate (this time) from a data row of real counts including the cumulated count (this time), and a step for converting the moving average counting rate (this time) into an engineering value and outputting the value, and the first noise processing includes; a step for outputting an engineering value at the previous time operation cycle as an engineering value at the this time operation cycle.

Furthermore, the radiation monitoring equipment according to the present invention, wherein if the operation unit judges that the number of times deviated from the permissible range is not zero, the operation unit judges whether the number of times deviated from the permissible range is within the permissible number of times or not, if the operation unit judges that the number of times deviated from the permissible range is out of the permissible number of times, the operation unit performs the regular processing and further resets the number of times deviated from the permissible range, if the operation unit judges that the number of times deviated from the permissible range is within the permissible number of times, the operation unit subtracts a cumulated count at an operation cycle just before the first noise processing from the cumulated count (previous time) to find a difference, and divides the difference with the number of times deviated from the permissible range+1 to find a first average real count, and judges whether the first average real count is within the permissible range or not, if the operation unit judges that the first average real count is within the permissible range, the operation unit performs a second noise processing and further resets the number of times deviated from the permissible range, and further wherein the second noise processing includes; a step for replacing a real count deviated from the permissible range with the first average real count, a step for obtaining a moving average counting rate (this time) based on a data row of real counts after replacement, and a step for converting the moving average counting rate (this time) into an engineering value and outputting the value.

Furthermore, the radiation monitoring equipment according to the present invention, wherein if the operation unit judges that the first average real count is not within the permissible range, the operation unit performs a third noise processing and furthermore resets the number of times deviated from the permissible range, and further wherein the third noise processing includes; a step for obtaining a second average real count by averaging a real count (this time) and a latest real count within the permissible range, a step for replacing a real count deviated from the permissible range with the second average real count, a step for obtaining a moving average counting rate (this time) based on a data row of real counts after replacement, and a step for converting the moving average counting rate into an engineering value and outputting the value.

Advantageous Effects of Invention

The radiation monitoring equipment according to the present invention includes; a radiation detector outputting a current signal when a radiation is incident thereon, a first conversion unit converting the current signal outputted from the radiation detector into a voltage signal and forming a rectangular wave pulse based on the voltage signal, a second conversion unit sampling the voltage signal converted in the first conversion unit and outputting a digital voltage data, a calculation unit counting a number of rectangular wave pulses formed in the first conversion unit, an operation unit calculating a cumulated count from the digital voltage data outputted from the second conversion unit and the number of rectangular wave pulses outputted from the calculation unit, and obtaining a real count (this time) from a difference of a cumulated count (this time) at a this time operation cycle and a cumulated count (previous time) at a previous time operation cycle and memorizing the real count (this time) and a display unit displaying operational results carried out in the operation unit; wherein the calculation unit reads in a real count (this time) and a cumulated count (previous time) at every operation cycle, the calculation unit judges whether the real count (this time) which is read in is within a permissible range or not, if the calculation unit judges that the real count (this time) is within the permissible range, the calculation unit judges whether a number of times deviated from the permissible range is zero or not, if the calculation unit judges that the number of times deviated from the permissible range is zero, the calculation unit performs a regular processing, if the calculation unit judges that the real count (this time) is out of the permissible range, the calculation unit adds 1 to the number of times deviated from the permissible range and further judges whether an added number of times deviated from the permissible range is equal to 1 or not, if the calculation unit judges that the added number of times deviated from the permissible range is equal to 1, the calculation unit memorizes the cumulated count (previous time) as a cumulated count just before the deviation of real count from the permissible range, and further performs a first noise processing, if the calculation unit judges that the added number of times deviated from the permissible range is not equal to 1, the calculation unit judges whether the added number of times deviated from the permissible range is within a permissible number of times or not, if the calculation unit judges that the number of times deviated from the permissible range is out of the permissible number of times, the calculation unit performs the regular processing, if the calculation unit judges that the number of times deviated from the permissible range is within the permissible number of times, the calculation unit performs the first processing, and; further wherein the regular processing includes; a step for calculating a moving average counting rate (this time) from a data row of real counts including the cumulated count (this time), and a step for converting the moving average counting rate (this time) into an engineering value and outputting the value, and the first noise processing includes; a step for outputting an engineering value at the previous time operation cycle as an engineering value at the this time operation cycle. By the above mentioned reasons, it becomes possible to obtain the radiation monitoring equipment which is capable of wide range and highly reliable measurement, with no substantial influence on measurement by a noise.

Furthermore, the radiation monitoring equipment according to the present invention, wherein if the operation unit judges that the number of times deviated from the permissible range is not zero, the operation unit judges whether the number of times deviated from the permissible range is within the permissible number of times or not, if the operation unit judges that the number of times deviated from the permissible range is out of the permissible number of times, the operation unit performs the regular processing and further resets the number of times deviated from the permissible range, if the operation unit judges that the number of times deviated from the permissible range is within the permissible number of times, the operation unit subtracts a cumulated count at an operation cycle just before the first noise processing from the cumulated count (previous time) to find a difference, and divides the difference with the number of times deviated from the permissible range+1 to find a first average real count, and judges whether the first average real count is within the permissible range or not, if the operation unit judges that the first average real count is within the permissible range, the operation unit performs a second noise processing and further resets the number of times deviated from the permissible range, and further wherein the second noise processing includes; a step for replacing a real count deviated from the permissible range with the first average real count, a step for obtaining a moving average counting rate (this time) based on a data row of real counts after replacement, and a step for converting the moving average counting rate (this time) into an engineering value and outputting the value. Then, an average real count is calculated based on the cumulated counts just before and just after the noise invasion. The real counts among the invasion period are interpolated to up-date the data row having a preset number of real counts in chronological order. Thereby, it is possible to offer the radiation monitoring equipment which is capable of highly reliable measurement, with no substantial missing measurements. Besides that, prevented are fluctuations by the reduction in the number of data concerning the calculation of the moving average counting rate and the stable accuracy in measurement can be acquired.

Furthermore, the radiation monitoring equipment according to the present invention, wherein if the operation unit judges that the first average real count is not within the permissible range, the operation unit performs a third noise processing and furthermore resets the number of times deviated from the permissible range, and further wherein the third noise processing includes; a step for obtaining a second average real count by averaging a real count (this time) and a latest real count within the permissible range, a step for replacing a real count deviated from the permissible range with the second average real count, a step for obtaining a moving average counting rate (this time) based on a data row of real counts after replacement, and a step for converting the moving average counting rate into an engineering value and outputting the value. Then, an average real count is calculated based on the cumulated counts just before and just after the noise invasion. The real counts among the invasion period are interpolated to up-date the data row having a preset number of real counts in chronological order. Thereby, it is possible to offer the radiation monitoring equipment which is capable of highly reliable measurement, with no substantial missing measurements. Besides that, prevented are fluctuations by the reduction in the number of data concerning the calculation of the moving average counting rate and the stable accuracy in measurement can be acquired.

BRIEF EXPLANATION OF DRAWINGS

FIG. 16 is a flow chart drawing for explaining the operation in step S151 in the radiation monitoring equipment in accordance with Embodiment 2 of the present invention.

DESCRIPTION OF EMBODIMENTS

Figure 1:
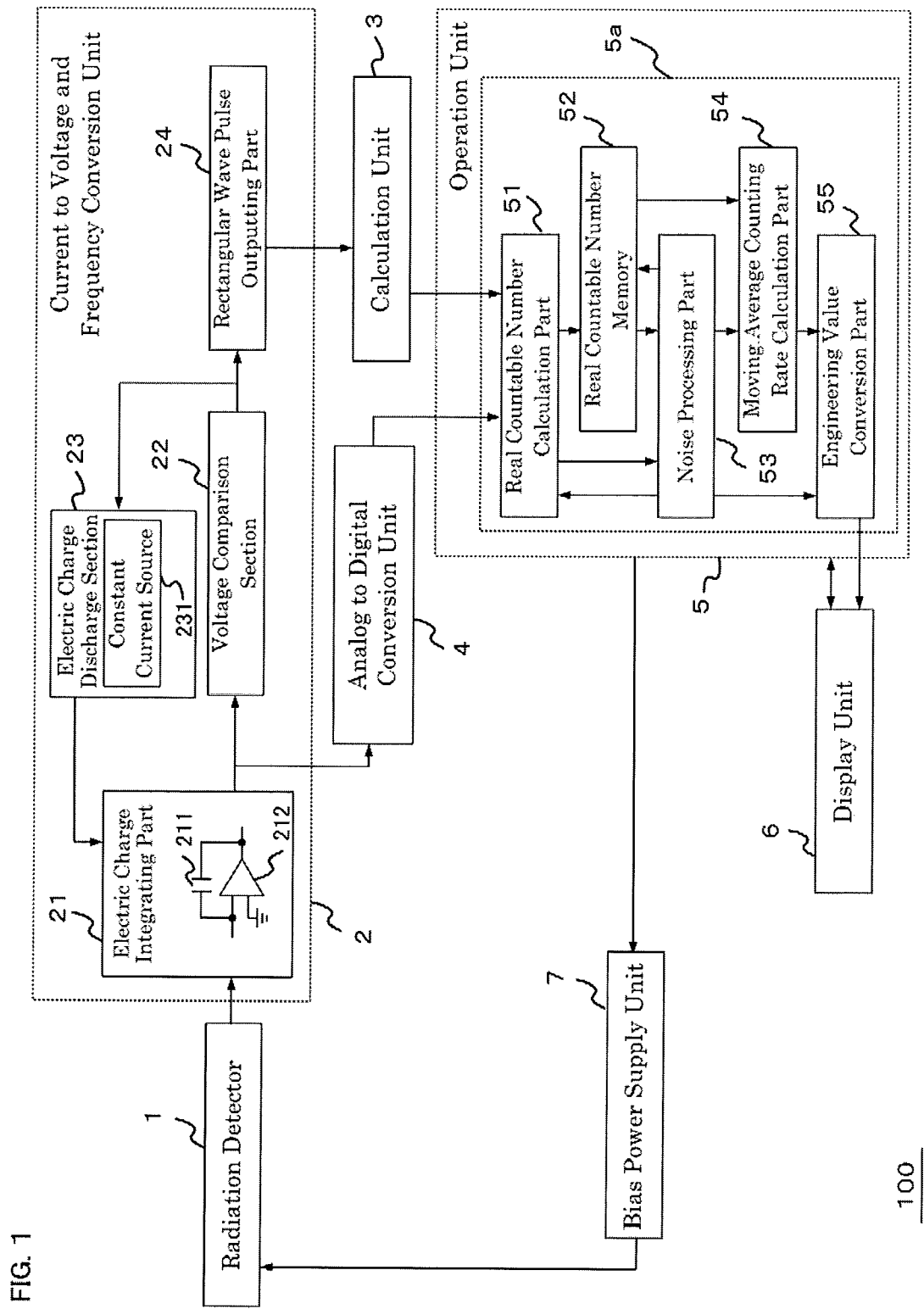
FIG. 1 is a drawing for showing constituent elements of the radiation monitoring equipment in accordance with the embodiments of the present invention.

Hereinafter, the radiation monitoring equipment according to the embodiments of the present invention will be described with reference to drawings. Incidentally, the same reference numerals are given to those identical or similar to constitutional portions in respective drawings and the size and/or the scale size of the corresponding respective constitutional portions are respectively independent. For example, when the identical constitutional portions, which are not changed, are shown, the size and/or the scale size of the identical constitutional portions may different among sectional views in which a part of the configuration is changed. Furthermore, although the configurations of the radiation monitoring equipment are further actually provided with a plurality of members, for ease of explanation, only portions necessary for explanation will be described and other portions are omitted.

Embodiment 1

FIG. 1 is a block diagram for showing the configuration of the radiation monitoring equipment 100 according to the embodiments of the present invention. As shown in the drawing, the radiation monitoring equipment 100 contains a radiation detector 1, a current to voltage and frequency conversion unit 2 (a first conversion unit), a calculation unit 3, an analog to digital conversion unit 4 (a second conversion unit), an operation unit 5, a display unit 6, a bias power supply unit 7 and the like. The radiation detector 1 is connected to the input side of the electric charge integrating part 21 of the current to voltage and frequency conversion unit 2. The radiation detector 1 outputs current signals generated by the incident radiation to the current to voltage and frequency conversion unit 2.

The current to voltage and frequency conversion unit 2 includes an electric charge integrating part 21, a voltage comparison section 22, an electric charge discharge section 23, and a rectangular wave pulse outputting part 24. The electric charge integrating part 21 has a capacitor 211 and an operational amplifier 212. As for the operational amplifier 212, the capacitor 211 is connected between an inverting input terminal and an output terminal. The output side of the operational amplifier 212 is connected to the input side of the voltage comparison section 22, and also to the input side of the analog to digital conversion unit 4. The output side of the voltage comparison section 22 is connected to the input side of the electric charge discharge section 23, and to the input side of the rectangular wave pulse outputting part 24. The electric charge discharge section 23 has a constant current source 231. The output side of the rectangular wave pulse outputting part 24 is connected to the input side of the calculation unit 3.

The output side of the calculation unit 3 is connected to the operation unit 5. The output side of the analog to digital conversion unit 4 is connected to the operation unit 5. The bias power supply unit 7 accepts instructions from the operation unit 5, and supplies, for example, a high voltage of some 600 to 800 V as a bias voltage, to the radiation detector 1. The operation unit 5 has an engineering value arithmetic processing means and a noise processing means, and the functions of those means are realized by the program carried out by a microprocessor 5a. The engineering value arithmetic processing means includes a real count calculation part 51, a real count memory 52, a moving average counting rate calculation part 54, and an engineering value conversion part 55. The noise processing means includes a noise processing part 53.

The operation unit 5 is connected with the display unit 6. The display unit 6 displays the data outputted from the operation unit 5, and furthermore carries out operations for set-ups and others of the operation unit 5. It should be noted that the current to voltage and frequency conversion unit 2, the calculation unit 3, the analog to digital conversion unit 4, the operation unit 5, the display unit 6, and the bias power supply unit 7 are contained in a box, for example. In other cases, all of the components including from the radiation detector 1 to the bias power supply unit 7 may be accommodated in one box.

As a radiation detector 1 which outputs a current signal, an ion chamber, a NaI (TI) scintillation detector, a plastic scintillation detector and the like may be adopted. Hereafter, it is assumed that the radiation detector 1 employs an ion chamber, which has an aluminum container with a rounded configuration, in which pressurized argon or nitrogen or those mixed gas is encapsulated. The ion chamber is capable of measuring a dose rate targeting an ionization current in the range from a background dose rate level on the order of $10^{-14}$ A to an accident dose rate level on the order of $10^{-7}$ A. At the accident dose rate level, monitoring is supposed to measure an accident of a nuclear power plant at the surrounding areas.

If an ion chamber is employed in the radiation detector 1, it is possible to measure a dose rate in a wide range of about 7 decades and with good (or flat) energy characteristics. The NaI (TI) scintillation detector and the plastic scintillation detector include a photo-multiplier as a detector constitute and have a large dark current on the order of $10^{-9}$ A. They are suitable for measuring the current signals in the high dose rate area, where the dark current can be ignored. Hereinafter, the ion chamber is employed as a representative of the radiation detector 1 and the operation of the radiation monitoring equipment 100 is explained as so.

In the response of a dose rate with respect to the incident radiation beams, the ion chamber (radiation detector 1) outputs a current proportional to the dose rate. The current to voltage and frequency conversion unit 2 takes in the current signal, and outputs a saw-tooth wavelike pulse with a repetition frequency proportional to the current and a rectangular wave pulse at the timing when the saw-tooth wavelike pulse is reversed from a top to a bottom of the pulse. The analog to digital conversion unit 4 samples the voltage signal which forms the saw-tooth wavelike pulse, and outputs a voltage value (digital converted data). The calculation unit 3 counts the number of rectangular wave pulses which are outputted from the rectangular wave pulse outputting part 24, and outputs a count. The count is reset at the set-up value (reset preset value), before the count results in overflow. The calculation unit 3 outputs also the reset information to the operation unit 5 as a special case, when the reset is inserted between the counting of numbers.

Figure 2:
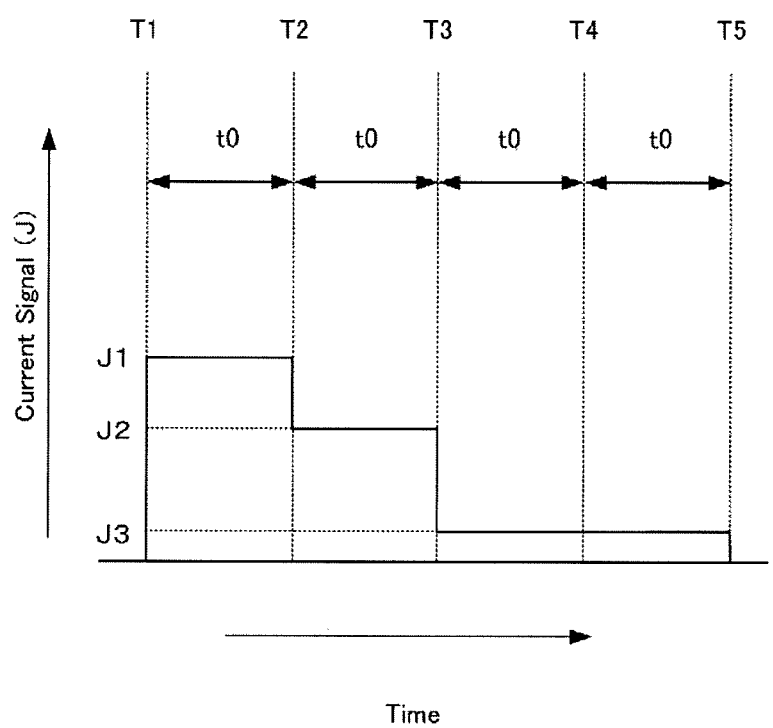
FIG. 2 is a signal waveform diagram for explaining the operation of the radiation monitoring equipment in accordance with the embodiments of the present invention, and is a drawing for showing the form of the current signal outputted from a radiation detector.
Figure 3:
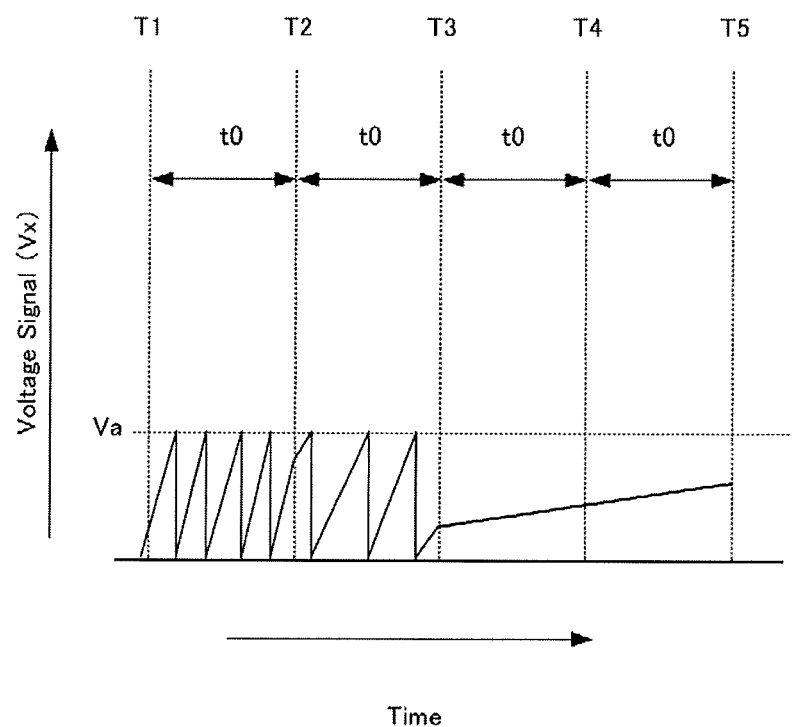
FIG. 3 is a signal waveform diagram for explaining the operation of the radiation monitoring equipment in accordance with the embodiments of the present invention, and is a drawing for showing schematically the waveform of a saw-tooth wavelike pulse.
Figure 4:
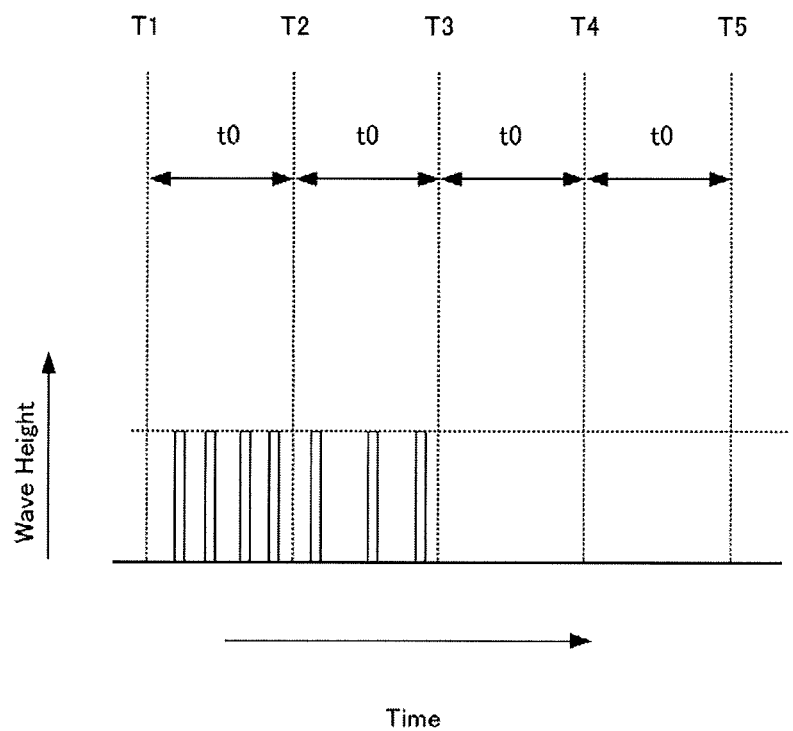
FIG. 4 is a signal waveform diagram for explaining the operation of the radiation monitoring equipment in accordance with the embodiments of the present invention, and is the drawing for showing schematically the shape of the pulse shape.

FIG. 2 to FIG. 4 show signal waveforms for explaining the operation of the radiation monitoring equipment 100 in accordance with the embodiments of the present invention. With reference to the drawings, the operation of the current to voltage and frequency conversion unit 2 is explained. In FIG. 2, it is assumed that the current signal (J) is outputted from the radiation detector 1 and changes in a step by step manner at interval t0 (operation cycle). The magnitude of the current signal (J) is current J1 from time T1 to time T2. The magnitude of the current signal (J) is current J2 from time T2 to time T3. The magnitude of the current signal (J) is current J3 between time T3 and time T4, and also from time T4 to time T5. The electric charge integrating part 21 of the current to voltage and frequency conversion unit 2 accepts the current signal (J), which the radiation detector 1 outputs and changes in a stepwise manner like this way, and accumulates it as an electric charge.

FIG. 3 shows a schematic view of the waveforms of saw-tooth wavelike pulses outputted from the electric charge integrating part 21, so that it may help the understanding of the operation of the radiation monitoring equipment 100. The electric charge integrating part 21 outputs a voltage signal (Vx), which is proportional to the accumulated electric charge. If the voltage signal (Vx) is over a preset value (Va), the voltage comparison section 22 reverses it and generates a trigger signal. When the electric charge discharge section 23 receives the trigger signal, a fixed current is triggered to flow into the capacitor 211 for a definite period of time from the constant current source 231, and the current is stored up in the capacitor 211.

If the electric charge discharge section 23 discharges the accumulated electric charge, the voltage value of the capacitor 211 will fall from a top to a bottom of a pulse. The rectangular wave pulse outputting part 24 outputs a rectangular wave pulse of a fixed voltage and of a predetermined duration, corresponding to the above mentioned trigger signal. FIG. 4 shows a schematic view of the waveforms of the rectangular wave pulses outputted from the rectangular wave pulse outputting part 24, so that it may help the understanding of the operation of the radiation monitoring equipment 100. The rectangular wave pulse outputting part 24 has issued four rectangular wave pulses from time T1 to time T2. The rectangular wave pulse outputting part 24 has issued three rectangular wave pulses from time T2 to time T3. Because the voltage signal is not over a preset value (Va) after time T3, no rectangular wave pulse is issued.

When an ion chamber is employed as a radiation detector, the repetition frequency of the rectangular wave pulses, which are outputted from the rectangular wave pulse outputting part 24, is as low as some cpm on a background level, and the resolution of the detector is low. For this reason, it is necessary to count numbers for several 10 minutes, in order to carry out a high precision measurement by the ion chamber. So, in the radiation monitoring equipment 100 according to the present embodiments, the following ways are taken to shorten the time for measurement. In the operation unit 6 of the radiation monitoring equipment 100, the real count calculation part 51 handles the voltage value (voltage data to which digital conversion was carried out) received from the analog to digital conversion unit 4. In the real count calculation part 51, a count is scored for a voltage difference between the peak voltage and the bottom voltage in a saw-tooth wavelike pulse which is outputted from the electric charge integrating part 21.

The real count calculation part 51 samples a voltage value of this time operation cycle in every operation cycle and obtains a count c (this time) which is smaller than one count, based on the voltage value at a this time operation cycle. The count c (this time) is added to a count C (this time), which is inputted from the calculation unit 3, to make a cumulated count (this time) of this time operational cycle={count C (this time)+count c (this time)}. A cumulated count (previous time) of previous time operation cycle={count C (previous time)+count c (previous time)} is subtracted from a cumulated count (this time) of this time operation cycle to obtain a difference (this time). The difference [{count C (this time)+count c (this time)}−{count C (previous time)+count c (previous time)}] is referred to as a real count (this time).

The real count (this time) is memorized in the real count memory 52, and is stored in a newest position of the data row of real counts. The operation unit 5 discards a real count at an oldest position in the real count memory 52, and up-dates the data row of real counts. The moving average counting rate calculation part 54 calculates a moving average counting rate (this time) from the up-dated data row of real counts. First, a set-upped data number of real counts are accumulated. The accumulated data of real counts are divided by the integrated time corresponding to those accumulated data, to obtain the moving average counting rate (this time). The data in the set-upped data number are stored in the real count memory 52 and arranged serially from the newest to the oldest, by trace backing the data. In this way, a fractional count, which is smaller than one count, is embedded the real count. By doing so, the operation unit 5 can increase the resolution in measurement and shorten the time for measurement.

The engineering value conversion part 55 multiplies a moving average counting rate by an engineering value conversion factor, to output an engineering value, for example, a dose rate (unit: nGy/h). The display unit G displays the outputted engineering value. When a regular processing (D0) is performed, resetting may be inserted between the processing. In this case, the calculation unit 3 also outputs the reset information (reset preset value and the like) as a special case. If the real count calculation part 51 receives a count and the reset information from the calculation unit 3, the real count calculation part 51, based on this reset information, calculates the real count (this time) of this time operation cycle by the equation; [{count C (this time)+ reset preset value+count c (this time)}−{count C (previous time)+count c (previous time)}]. At the following operation cycle, the process for obtaining a real count is switched to the regular process. Used is the following equation; [{count C (this time)+count c (this time)}−{count C (previous time)+count c (previous time)}].

Figure 5:
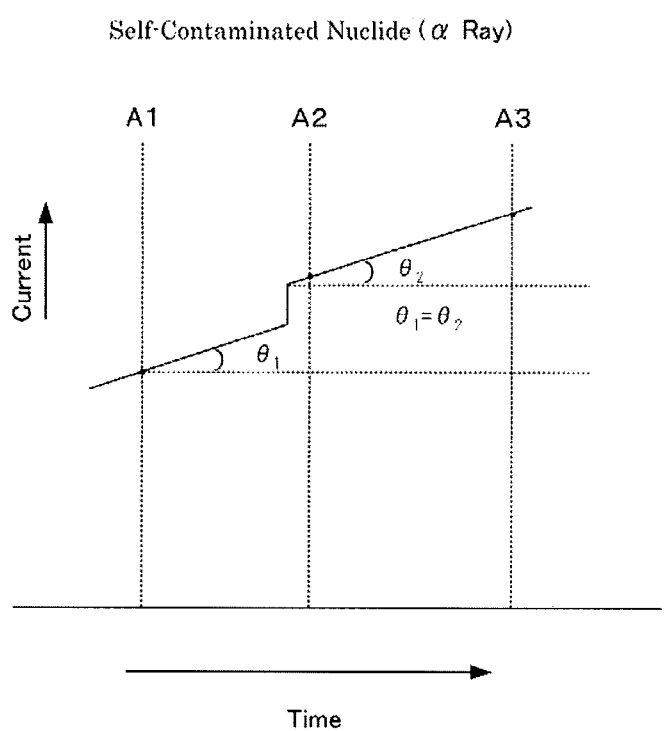
FIG. 5 is a drawing for showing the shape of a noise superimposed on the signal waveform of the radiation monitoring equipment in accordance with the embodiments of the present invention, and is the drawing for showing the shape of a noise due to a self-contaminated nuclide.
Figure 6:
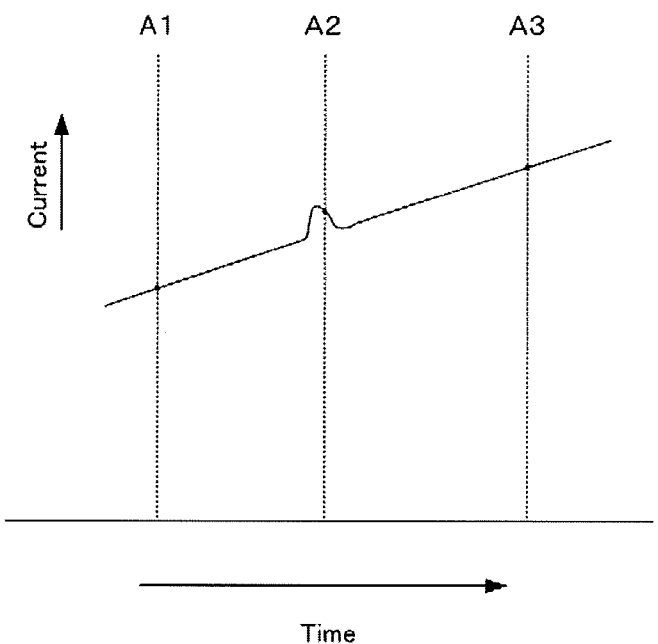
FIG. 6 is a drawing for showing the shape of a noise superimposed on the signal waveform of the radiation monitoring equipment in accordance with the embodiments of the present invention, and is the drawing for showing the shape of a noise due to the static electricity.
Figure 7:
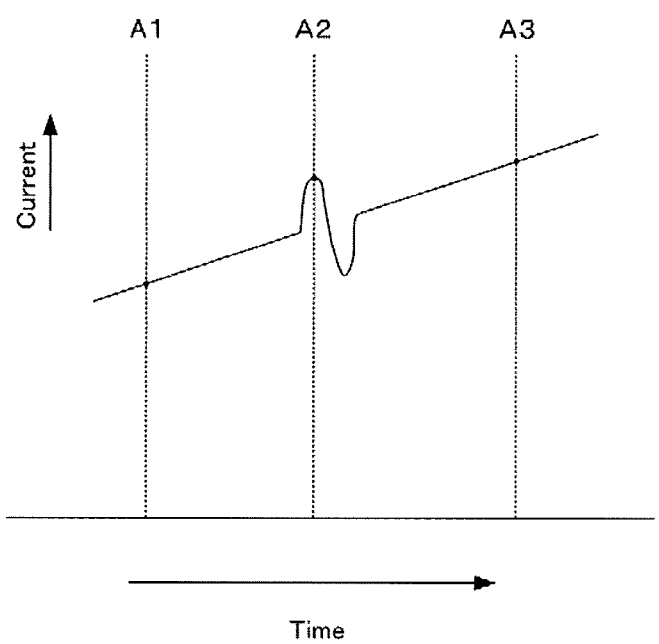
FIG. 7 is a drawing for showing the shape of a noise superimposed on the signal waveform of the radiation monitoring equipment in accordance with the embodiments of the present invention, and is the drawing for showing the shape of a noise due to the electromagnetic induction.

Next, with reference from FIG. 5 to FIG. 7, the relations between the sudden changed shapes in a saw-tooth wavelike pulse and noises are explained. The drawings show the kinds and shapes of the noises which are superimposed on a signal waveform. FIG. 5 shows a case in which an alpha ray emitted from the natural nuclide pushes up the inclination of a saw-tooth wavelike pulse and the inclination is discontinuous by the sudden change. The alpha ray is emitted from the natural nuclide, which is exposed in the inner wall of the ion chamber by chance or is remained without being removed by a manufacturing process. In this case, the saw-tooth wave pulse keeps the push up and does not return to the base. Voltage, equivalent to the electric charge generated in the ion chamber by the alpha ray, is superimposed on a signal waveform, and the signal waveform is on increase discontinuously. Then, the signal waveform shifts from a lift up point as a starting point, with the original inclination.

The analog to digital conversion unit 4 carries out the sampling of the voltage value of a saw-tooth wavelike pulse for measurement and the real count calculation part 51 takes in the voltage value of the saw-tooth wavelike pulse at a constant frequency. At time A1, shown is the voltage value, which is in a normal state and is a value before the occurrence of a noise. At time A2 and at the subsequent time A3, it is shown that the real count calculation part 51 takes in the voltage value which is after the occurrence of a noise. The signal waveforms of time A1 and time A3 show that the inclination of a saw-tooth wavelike pulse is returned to a normal state, retaining the voltage change by a noise.

The ion chamber is manufactured with aluminum of a high purity, for example. On the inner surface of the ion chamber, a natural nuclide may be exposed to in a rare case. Or, a very small quantity of the radon, the TRON, or its progeny nuclide in the air may be remained or mixed in, during the time between from the filling processes of the ionization gas to the cleaning process of an ion chamber. For these reasons, a sudden change, as shown in the drawing, emerges on a signal waveform at a very rare frequency.

FIG. 6 shows a shape of the sudden change in the saw-tooth wavelike pulse by a noise due to static electricity. In the drawing, it is shown that a chevron type sudden change appears on the inclination of a saw-tooth wavelike pulse, and after that, the inclination of the saw-tooth wavelike pulse returns to the original and fundamental inclination. Noises by the static electricity are generated, when any one of the radiation detector 1, the electric charge integrating part 21, or a current signal line between the both is affected by the static electricity. Electric charges due to the noise are charged in the capacitor 211 of the electric charge integrating part 21, and then they are gradually discharged.

At the timing of time A1, the real count calculation part 51 reads in the voltage value which is a value before a noise is generated and in the normal state. At the timing of time A2, the real count calculation part 51 reads in the voltage value where electric charges by the noise are under discharge. At the timing of time A3, the real count calculation part 51 reads in the voltage value which is on the extension line of time A1 and has returned to the normal saw-tooth wavelike pulse.

FIG. 7 shows a case where the radiation monitoring equipment is under the influence of an electromagnetic induction noise and an oscillating noise is overlapped on a saw-tooth wavelike pulse. At the timing of time A1, the real count calculation part 51 reads in the voltage value of the normal state, before a noise is generated. At the timing of time A2, the real count calculation part 51 reads in the voltage value where electric charges by the noise are under charge. At the timing of time A3, the real count calculation part 51 reads in the voltage value which is on the extension line of time A1 and has returned to the normal saw-tooth wavelike pulse.

Figure 8:
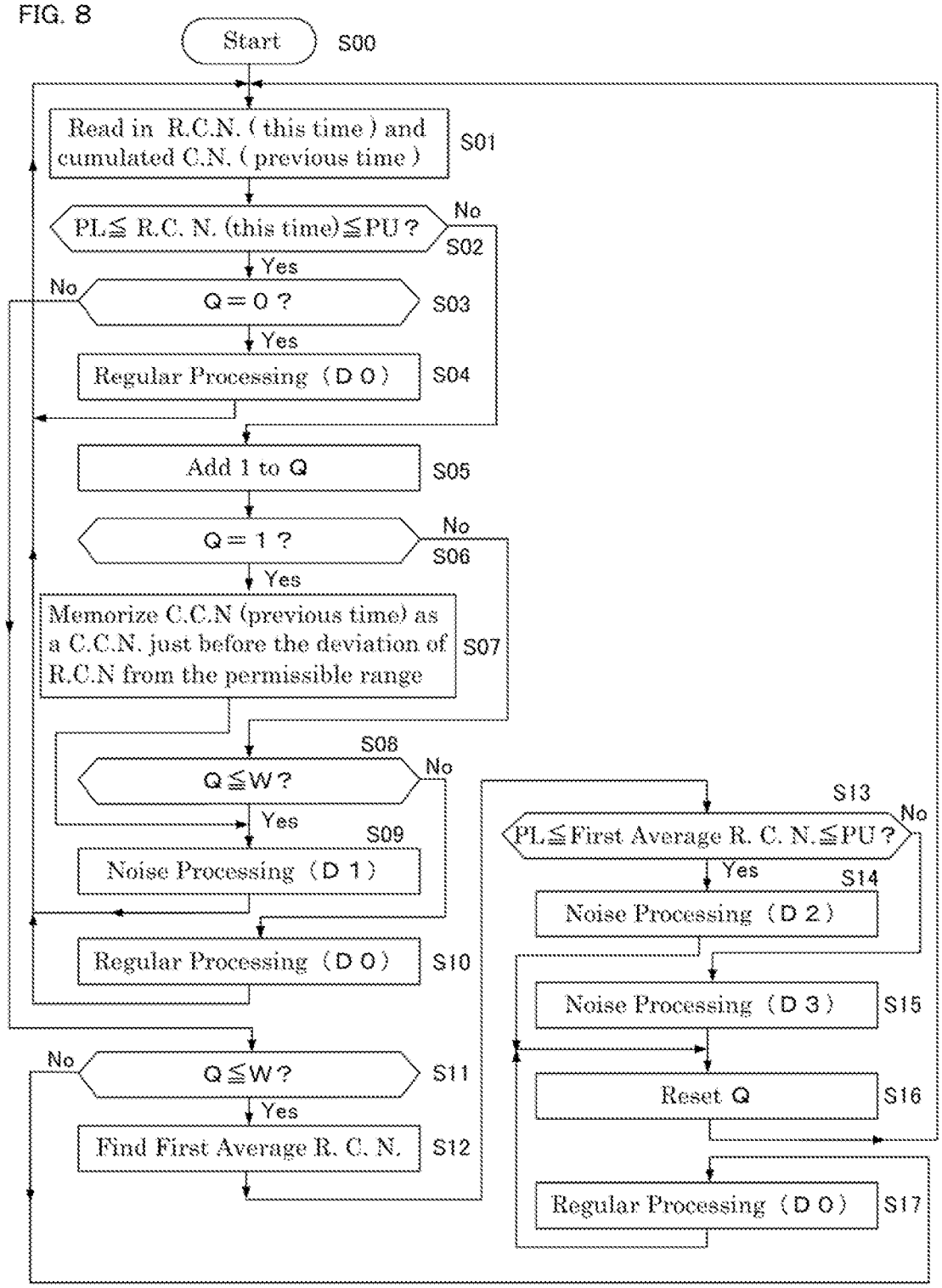
FIG. 8 is a flow chart drawing for explaining the operation of the radiation monitoring equipment in accordance with Embodiment 1 of the present invention.

Next, in reference to the flow chart of FIG. 8, explanation is made on the operations of the radiation monitoring equipment 100. The flow chart shown in the drawing also explains procedures of the noise processing in the noise processing part 53 (noise processing means), besides the regular processing in the operation unit 5 (engineering value arithmetic processing means). When the measurement for radiation monitoring starts in step S00, the noise processing part 53 reads in a real count (this time) obtained at a this time operation cycle from the real count memory 52 and a cumulated count (previous time) obtained at a previous time operation cycle from the real count calculation part 51, respectively at step S01. In step S02, the real count (this time) is judged whether it falls in a predetermined permissible range (from a permissible lower limit; PL to a permissible upper limit; PU). In other words, it is judged whether the equation: permissible lower limit (PL)≤real count (this time)≤permissible upper limit (PU): is satisfied or not.

If the judgment of step S02 is Yes, the process progresses to step S03. In step S03, it is judged whether Q is zero or not. Here, Q is referred to as a number of times deviated from the permissible range and represents the number of times that the real count (this time) has deviated from the permissible range. If the judgment of step S03 is Yes, the process progresses to step S04. In step S04, a regular processing (D0) is performed. First, the moving average counting rate calculation part 54 calculates a moving average counting rate (this time) of this time operation cycle, and outputs it. An engineering value is obtained in the engineering value conversion part 55, based on the moving average counting rate (this time) and is outputted. Further, the engineering value is displayed in the display unit 6. When a series of this regular processing (D0) is completed, the process will return to step S01 (see FIG. 9, for reference).

If the judgment of step S02 is No, the process progresses to step S05. In step S05, the number of times deviated from the permissible range (Q), which represents a number of times that real count (this time) has deviated from the permissible range, is added 1, and the process progresses to S06. In step S06, it is judged whether Q is equal to 1 or not. If the judgment of step S06 is Yes, the process progresses to step S07. In step S07, the cumulated count (previous time) is memorized as a cumulated count just before the deviation of real count from the permissible range, and the process progresses to step S09. If the judgment of step S06 is No, the process progresses to step S08. In step S08, it is judged whether Q≤W is satisfied or not. Here, a permissible number of times (W) is set to Q.

If the judgment of step S08 is Yes, the process progresses to step S09. In stop S09, a noise processing (D1) is carried out. First, the engineering value conversion part 55 outputs the engineering value at the previous time operation cycle as an engineering value of this time operation cycle. The outputted engineering value is displayed in the display unit 6. When a series of the noise processing (first noise processing) is completed, the process returns to step S01 (see FIG. 10, for reference). If the judgment of step S08 is No, the process progresses to step S10. In step S10, the regular processing (D0) is performed and the process returns to step S01 (see FIG. 9, for reference).

Figure 11:
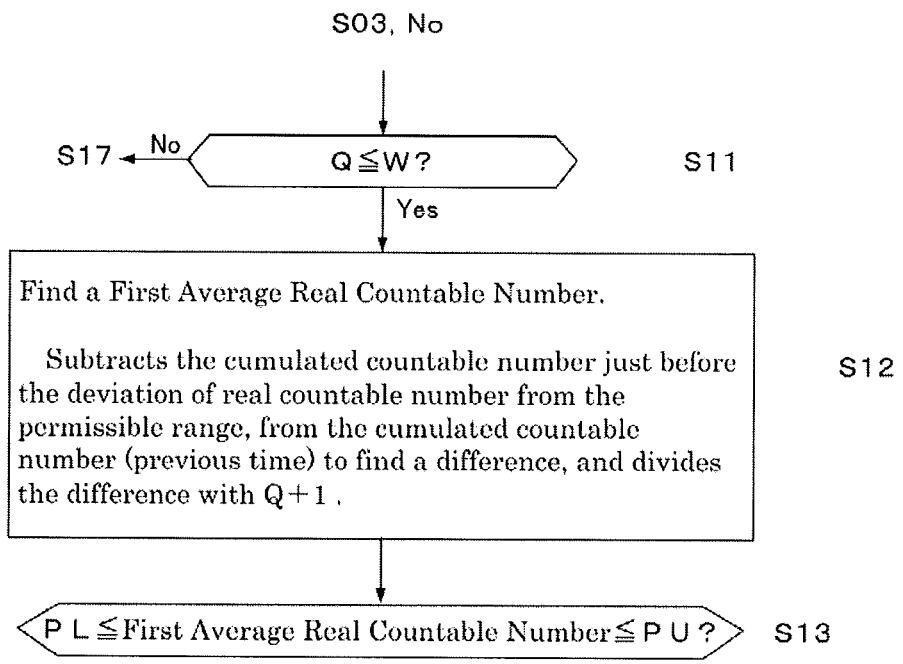
FIG. 11 is a flow chart drawing for explaining the operation which obtains a first average real count in the radiation monitoring equipment in accordance with the embodiments of the present invention.

If the judgment of step S03 is No, the process progresses to step S11. In step S11, it is judged whether Q is not greater than W or not (Q≤W). If the judgment of step S11 is Yes, the process progresses to step S12. In step S12, a first average real count is calculated and the process progresses to step S13 (see FIG. 11, for reference). The operation unit subtracts the cumulated count just before the deviation of real count from the permissible range, from the cumulated count (previous time) to find a difference, and divides the difference with Q+1 to find a first average real count. "Q+1" is equivalent to the number of times that the first noise processing is performed.

In step S13, it is judged whether the first average real count is within the permissible range or not. In other words, it is judged whether the permissible lower limit (PL)≤the first average real count≤the permissible upper limit (PU) is satisfied or not. Here, the permissible lower limit (PL) and the permissible upper limit (PU) of the first average real count are the same with the permissible lower limit (PL) and the permissible upper limit (PU) of the real count (this time), respectively.

Figure 12:
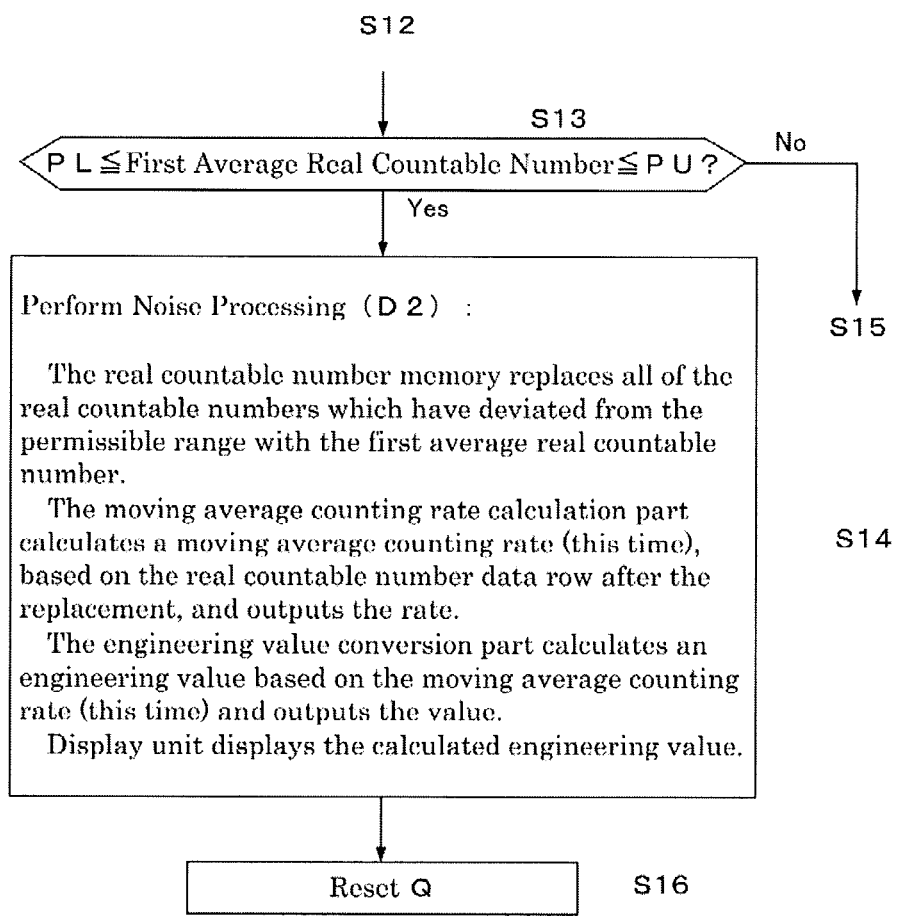
FIG. 12 is a flow chart drawing for explaining the operation of a noise processing (D2) in the radiation monitoring equipment in accordance with the embodiments of the present invention.

If the judgment of step S13 is Yes, the process progresses to step S14 (see FIG. 12, for reference). In step S14, a noise processing (D2) is performed. First, in the real count memory 52, all of the real counts at a period when the real count deviated from the permissible range are replaced by the first average real count. The moving average counting rate calculation part 54 calculates a moving average counting rate (this time), based on the real count data row after the replacement, and outputs it. The engineering value conversion part 55 calculates an engineering value based on the moving average counting rate (this time) and outputs the value. The calculated engineering value is displayed in the display unit 6. When a series of above mentioned noise processing (second noise processing) is finished, the number of times deviated from the permissible range (Q) is reset at step S16, and the process returns to step S01.

Figure 13:
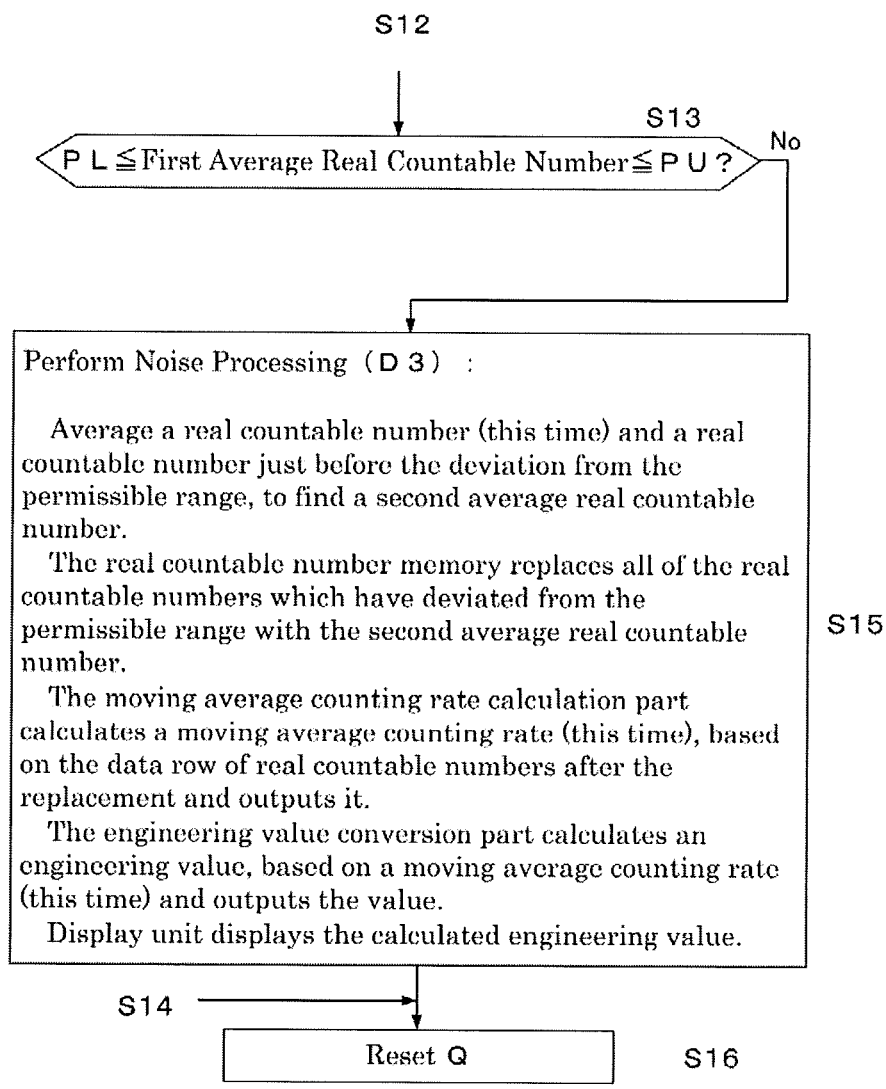
FIG. 13 is a flow chart drawing for explaining the operation of a noise processing (D3) in the radiation monitoring equipment in accordance with the embodiments of the present invention.
Figure 14:
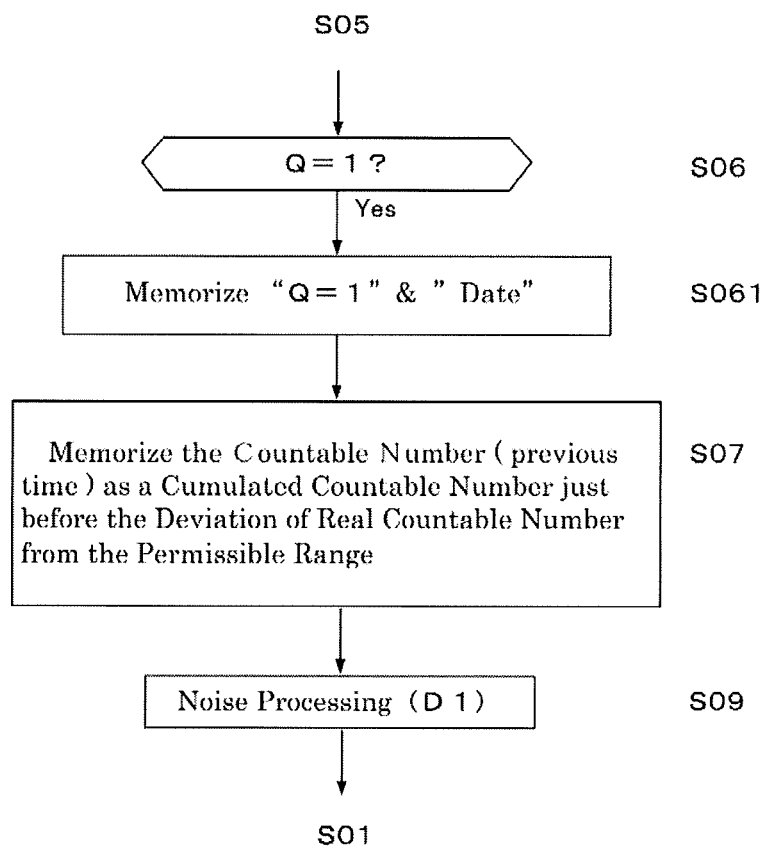
FIG. 14 is a flow chart drawing for explaining the operation in step S061 in the radiation monitoring equipment in accordance with Embodiment 2 of the present invention.
Figure 15:
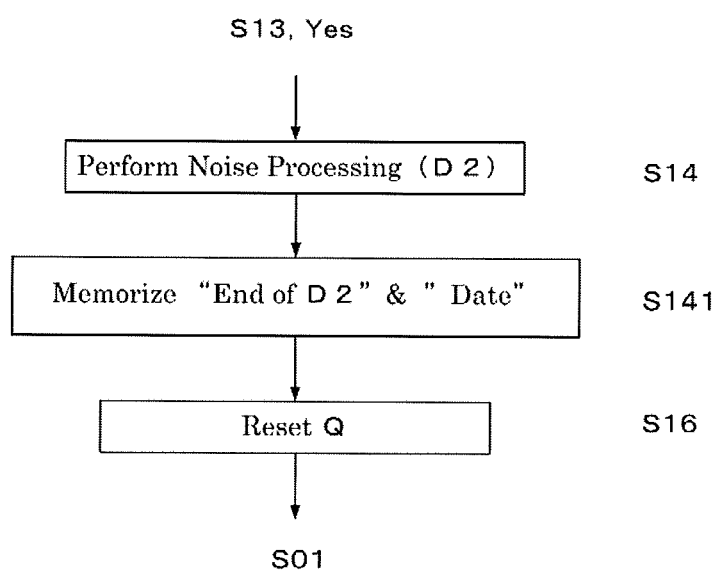

If the judgment of step S13 is No, the process progresses to step S15 (see FIG. 13, for reference). In step S15, a noise processing (D3) is performed. First, a real count (this time) and a real count just before the deviation from the permissible range are averaged to calculate a second average real count. In the real count memory 52, all of the real counts within a deviation period from the permissible range are replaced by the second average real count. The moving average counting rate calculation part 54 calculates a moving average counting rate (this time), based on the data row of real count after the replacement and sends it out. The engineering value conversion part 55 calculates an engineering value, based on a moving average counting rate (this time) and outputs the value. The calculated engineering value is displayed in the display unit 6. When a series of above mentioned noise processing (third noise processing) is finished, the number of times deviated from the permissible range (Q) is reset by stop S16, and the process returns to step S01.

Figure 9:
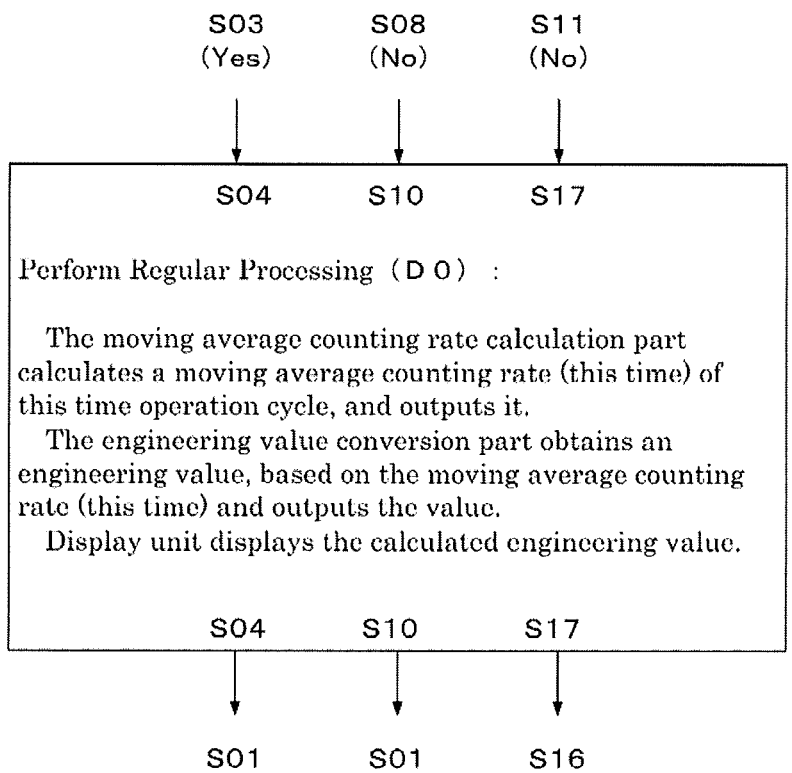
FIG. 9 is a flow chart drawing for explaining the operation of a regular processing (D0), in the radiation monitoring equipment, in accordance with the embodiments of the present invention.
Figure 10:
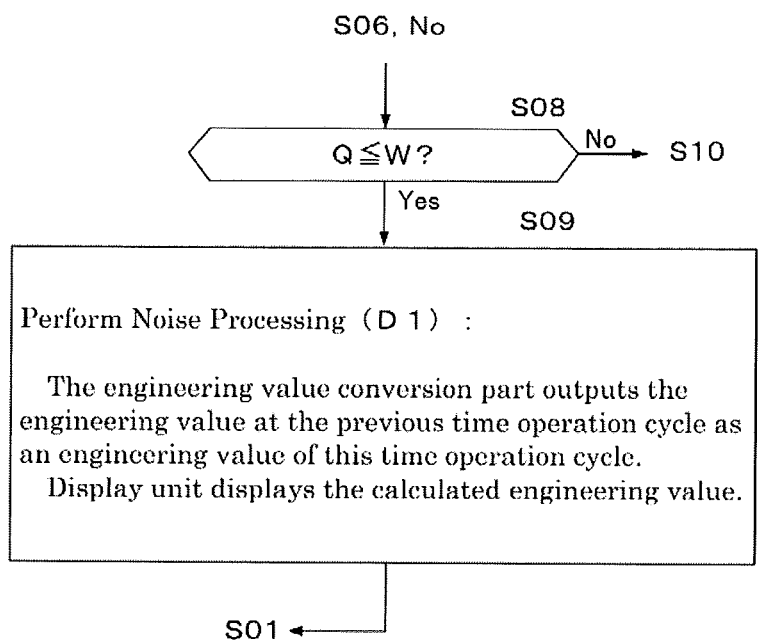
FIG. 10 is a flow chart drawing for explaining the operation of a noise processing (D1) in the radiation monitoring equipment in accordance with the embodiments of the present invention.

If the judgment of step S11 is No, the process progresses to step S17 (see FIG. 9, for reference). In step S17, the regular processing (D0) is performed, and then, the process progresses to step S16. In step S16, the number of times deviated from the permissible range (Q) is reset, and the process returns to step S01. Even if a cumulated count returns to a normal state at the following operation cycle, from the state of permissible lower limit PL≤real count (this time)≤permissible upper limit PU, the real count does not return to the normal state usually, under the influence of the cumulated count at the previous time operation cycle. The real count will come back to a normal state, after one cycle in operation is over.

However, as a very rare phenomenon, the cumulated count comes back to a normal state, without the delay of a cycle in operation, when a cumulated count of previous time operation cycle sways in a certain direction by a noise, a cumulated count of this time operation cycle sways in the opposite direction, and the widths of swaying are equivalent. In this case, there is no substantial influence, although the noise processing (D2) or the noise processing (D3) will be carried out.

The noise processing part 53 detects the radiation of a measuring target as the deviation from the permissible range of a real count, if the radiation changes significantly on the basis of the normal background level. The deviation from the permissible range is generated also by the increase of the progeny nuclide of radon or TRON, at a near-by site of the radiation monitoring equipment, in connection with rain fall or snow fall in addition to a noise. This is also true in an accident at the institution on a watch list. These houses are targets of measurement. Accordingly, it is desirable to output the data in real time, in order to eliminate the response delay or missing in measurement as much as possible.

The deviation of real counts from the permissible range, which results from these above reasons, has a long duration time, compared with a general transient noise. For example, a transient noise ceases within 2 cycles of operation, when a cycle of the operation is set in 5 seconds. While the cumulated count makes a comeback to a normal state at 3 cycles of the operation, a real count makes a comeback to a normal state at 4 cycles of the operation. The permissible number of times (W) is a natural number and larger than one. For example, a delay of the response will be 20 seconds, if W is set as 4. The delay of this level is adequately settled in a tolerance level.

The static electricity noise in a radiation detector, the electromagnetism noise of air propagation and the like do not affect the inclination of saw-tooth wavelike pulses before and after the noise invasion. By performing the above mentioned noise processing (D2), a real count during a noise invasion period is replaced by the first average real count. Thereby, real data having a missing part can be restored.

Further, a sudden noise current is generated by an alpha ray emitted from the natural nuclide on the wall surface of an ion chamber, when the radiation detector 1 employs an ion chamber. The output of a saw-tooth wave at the electric charge integrating part 21 makes a sudden change rise and becomes discontinuous. Because the sudden change rise is a single shot phenomenon which occurs very rarely, the inclination of the saw tooth wave comebacks to a normal state at the following cycle of the operation. Missing in measurement which occurs with this phenomenon is 2 cycles of operation at maximum. By performing the above mentioned noise processing (D3), the real count of the concerned operation cycle is replaced by the second average real count. Thereby, the measurement is not influenced substantially.

A static electricity noise is one of the typical electromagnetism noises by which a radiation monitoring equipment 16 affected. A positive or negative noise current invades into the input of the electric charge integrating part 21 and an output signal is sent out from it. The static electricity noise is superimposed on a saw-tooth wavelike pulse of the output signal as a positive or negative sudden change voltage noise. Further, a noise current invades into the input of the electric charge integrating part 21 and vibrates alternately between a negative and a positive value. The electromagnetism noise is superimposed on a saw-tooth wavelike pulse of the output signal as an oscillating voltage noise. In both noises, the current signal component under the noise invasion is faithfully reflected on a saw-tooth wavelike pulse immediately after the cease of the noises. Because the fundamental wave form of a saw-tooth wavelike pulse, as an output signal of the electric charge integrating part 21, is not influenced, the above mentioned noise processing (D2) is applied to the process.

Further, the fundamental wave form of a saw-tooth wavelike pulse undergoes a step-like sudden change, as a single shot phenomenon, due to the alpha ray of the self-contaminated radioactive material in the radiation detector. The self-contaminated radioactive material does not influence the fundamental wave form (output signal of the electric charge integrating part 21) of a saw-tooth wavelike pulse. Accordingly, the above-mentioned noise processing (D3) is applied to the process, if the step-like sudden change is removed. In the noise processing (D3), the second average real count is calculated, based on the cumulated count of immediately just before and just after the noise invasion, and the values between are interpolated. The data row of real counts (row of the real counts in chronological order) is consist of a set-up number of data and is made to be up-dated. Accordingly, a high reliance and highly precise radiation monitoring equipment is obtained without missing in the measurement.

The radiation monitoring equipment according to this invention includes, a radiation detector which detects radiation and outputs a current signal; a current to voltage and frequency conversion unit which accumulates the electric charge of the current signal and changes it into a voltage signal, and discharges the electric charge accumulated when the voltage signal is beyond the preset voltage level, and outputs a rectangle wave pulse, and outputs the saw-tooth wavelike pulse of the repetition frequency proportional to a current signal, by repeating the accumulation and electric discharge of an electric charge; an analog to digital conversion unit which samples the voltage signal which forms the above-mentioned saw wavelike pulse, and outputs a voltage value; a calculation unit and an operation unit which calculate the above-mentioned rectangle wave pulse and outputs a count.

The above-mentioned operation unit has an engineering value operation processing means and a noise processing means. The above-mentioned engineering value operation processing means inputs the above-mentioned voltage value and the above-mentioned count at every operation cycle; calculates a count less than one based on the above-mentioned voltage value; adds the above mentioned count to the count less than one to calculate an addition count; calculates the real count as a difference of the above-mentioned cumulated counts of a this time operation cycle and a previous time operation cycle; takes in the above-mentioned real count of this time operation cycle, in the form to up-date the data row of the set-up number of data, as the serial row of the above-mentioned real count; finds a moving average counting rate, based on the data row; and changes the moving average counting rate into an engineering value, and outputs it.

When the above-mentioned real count of this time operation cycle is within a permissible range, the above-mentioned noise processing means performs a regular processing which outputs the engineering value based on the above-mentioned moving average count of this time operation cycle, to the above-mentioned engineering value operation processing means. When the above-mentioned real count of this time operation cycle is deviated from the above-mentioned permissible range, the above-mentioned noise processing means performs a series of the first noise processing, where the engineering value of an operation cycle just before deviating from the above-mentioned permissible range is made to output. When the number of times of performing the first noise processing continuously is less than a predetermined number, the first noise processing is made to continue. If the above-mentioned real count returns to the permissible range within the predetermined number, the above-mentioned noise processing means subtracts the above-mentioned cumulated count of the operation cycle just before the first noise processing from the above-mentioned cumulated count of this time operation cycle. The difference is divided by the number of times (Q+1) of performing first noise processing, and the first average real count is calculated.

When the first average real count is within the above-mentioned permissible range, the above-mentioned noise processing means replaces the above-mentioned real count with this first average real count, and finds the above-mentioned moving average counting rate. Furthermore, the above-mentioned noise processing means performs a second noise processing which changes the moving average counting rate into the above-mentioned engineering value, and outputs it. The number of times of performing the first noise processing is reset, and a series of the noise processing are terminated.

When the first average real count is deviated from the above-mentioned permissible range, the above-mentioned noise processing means replaces respective real counts (this time), which are deviated from the permissible range with the second average real count just before the real count (this time) and within the above-mentioned permissible range, and finds the above-mentioned moving average counting rate. The above-mentioned noise processing means performs the third noise processing which changes the moving average counting rate into the above-mentioned engineering value, and outputs it. The number of times of performing the first noise processing is reset, and a series of the noise processing are terminated. When the above-mentioned real count returns to the permissible range within the above-mentioned predetermined number of times, the noise processing is made to skip and the regular processing is performed. If the above-mentioned real count returns to the permissible range, the number of times of performing the first noise processing will be reset, and the skip of the noise processing is reset.

A radiation monitoring equipment according to the present invention includes; a radiation detector outputting a current signal when a radiation is incident thereon, a first conversion unit converting the current signal outputted from the radiation detector into a voltage signal and forming a rectangular wave pulse based on the voltage signal, a second conversion unit sampling the voltage signal converted in the first conversion unit and outputting a digital voltage data, a calculation unit counting a number of rectangular wave pulses formed in the first conversion unit, an operation unit calculating a cumulated count from the digital voltage data outputted from the second conversion unit and the number of rectangular wave pulses outputted from the calculation unit, and obtaining a real count (this time) from a difference of a cumulated count (this time) at a this time operation cycle and a cumulated count (previous time) at a previous time operation cycle and memorizing the real count (this time) and a display unit displaying operational results carried out in the operation unit; wherein the calculation unit reads in a real count (this time) and a cumulated count (previous time) at every operation cycle, the calculation unit judges whether the real count (this time) which is read in is within a permissible range or not, if the calculation unit judges that the real count (this time) is within the permissible range, the calculation unit judges whether a number of times deviated from the permissible range is zero or not, if the calculation unit judges that the number of times deviated from the permissible range is zero, the calculation unit performs a regular processing, if the calculation unit judges that the real count (this time) is out of the permissible range, the calculation unit adds 1 to the number of times deviated from the permissible range and further judges whether an added number of times deviated from the permissible range is equal to 1 or not, if the calculation unit judges that the added number of times deviated from the permissible range is equal to 1, the calculation unit memorizes the cumulated count (previous time) as a cumulated count just before the deviation of real count from the permissible range, and further performs a first noise processing, if the calculation unit judges that the added number of times deviated from the permissible range is not equal to 1, the calculation unit judges whether the added number of times deviated from the permissible range is within a permissible number of times or not, if the calculation unit judges that the number of times deviated from the permissible range is out of the permissible number of times, the calculation unit performs the regular processing, if the calculation unit judges that the number of times deviated from the permissible range is within the permissible number of times, the calculation unit performs the first processing, and; further wherein the regular processing includes; a step for calculating a moving average counting rate (this time) from a data row of real counts including the cumulated count (this time), and a step for converting the moving average counting rate (this time) into an engineering value and outputting the value, and the first noise processing includes; a step for outputting an engineering value at the previous time operation cycle as an engineering value at the this time operation cycle.

Furthermore, the radiation monitoring equipment according to the present invention, wherein if the operation unit judges that the number of times deviated from the permissible range is not zero, the operation unit judges whether the number of times deviated from the permissible range is within the permissible number of times or not, if the operation unit judges that the number of times deviated from the permissible range is out of the permissible number of times, the operation unit performs the regular processing and further resets the number of times deviated from the permissible range, if the operation unit judges that the number of times deviated from the permissible range is within the permissible number of times, the operation unit subtracts a cumulated count at an operation cycle just before the first noise processing from the cumulated count (previous time) to find a difference, and divides the difference with the number of times deviated from the permissible range+1 to find a first average real count, and judges whether the first average real count is within the permissible range or not, if the operation unit judges that the first average real count is within the permissible range, the operation unit performs a second noise processing and further resets the number of times deviated from the permissible range, and further wherein the second noise processing includes; a step for replacing a real count deviated from the permissible range with the first average real count, a step for obtaining a moving average counting rate (this time) based on a data row of real counts after replacement, and a step for converting the moving average counting rate (this time) into an engineering value and outputting the value.

Furthermore, the radiation monitoring equipment according to the present invention, wherein if the operation unit judges that the first average real count is not within the permissible range, the operation unit performs a third noise processing and furthermore resets the number of times deviated from the permissible range, and further wherein the third noise processing includes; a step for obtaining a second average real count by averaging a real count (this time) and a latest real count within the permissible range, a step for replacing a real count deviated from the permissible range with the second average real count, a step for obtaining a moving average counting rate (this time) based on a data row of real counts after replacement, and a step for converting the moving average counting rate into an engineering value and outputting the value.

Embodiment 2

A radiation monitoring equipment 100 in accordance with Embodiment 2 is explained based on FIG. 8, FIG. 14, FIG. 15 and FIG. 16. The radiation monitoring equipment 100 in accordance with Embodiment 2 operates fundamentally according to the flow chart shown in FIG. 8. According to Embodiment 2, as shown in the flow chart of FIG. 14, the process of step SO61 is added between step S06 and step SO7, which are employed in the flow chart of FIG. 8 of Embodiment 1. If the judgment of step S06 is Yes, "Q=1" and "Date; year, month, day, time" are memorized at step S061. In a similar manner, as shown in the flow chart of FIG. 15, the process of step S141 is added between step S14 and stop S16, which are employed in the flow chart of FIG. 8. "End of D2" and "Date; year, month, day, time" are memorized at step S141.

Figure 16:
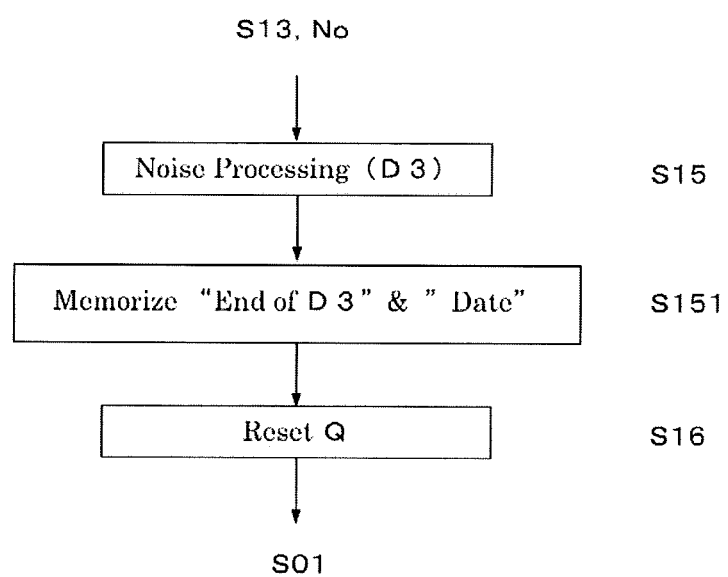
FIG. 16 is a flow chart drawing for explaining the operation in step S141 in the radiation monitoring equipment in accordance with Embodiment 2 of the present invention.

Further, as shown in the flow chart of FIG. 16, the process of step S151 is added between step S15 and step S16 of the flow chart of FIG. 8. "End of D3" and "Date; year, month, day, time" are memorized at step S151. On the request of a user from the display unit 6, those memorized contents are displayed on the display unit 6. When the radiation detector 1 employs an ion chamber, it can be presumed whether the noise is an electric noise or a self-contaminated alpha ray noise, from the invasion period of a noise.

At the time of a periodic performance testing of the radiation monitoring equipment, investigation of the noise causes, like the contact resistance at a grounding wire connection place and others, is planned, depending on user's needs. These pieces of information can be used as the maintenance information for conducting the investigation of noise causes efficiently. The above-mentioned noise processing means memorizes the starting date (year, month, day and time) of the first noise processing, the execution date (year, month, day and time) of the second noise processing, and the execution date (year, month, day and time) of third noise processing, respectively. The engineering value arithmetic processing means displays these data, including year, month, day and time, on request.

Embodiment 3

Figure 17:
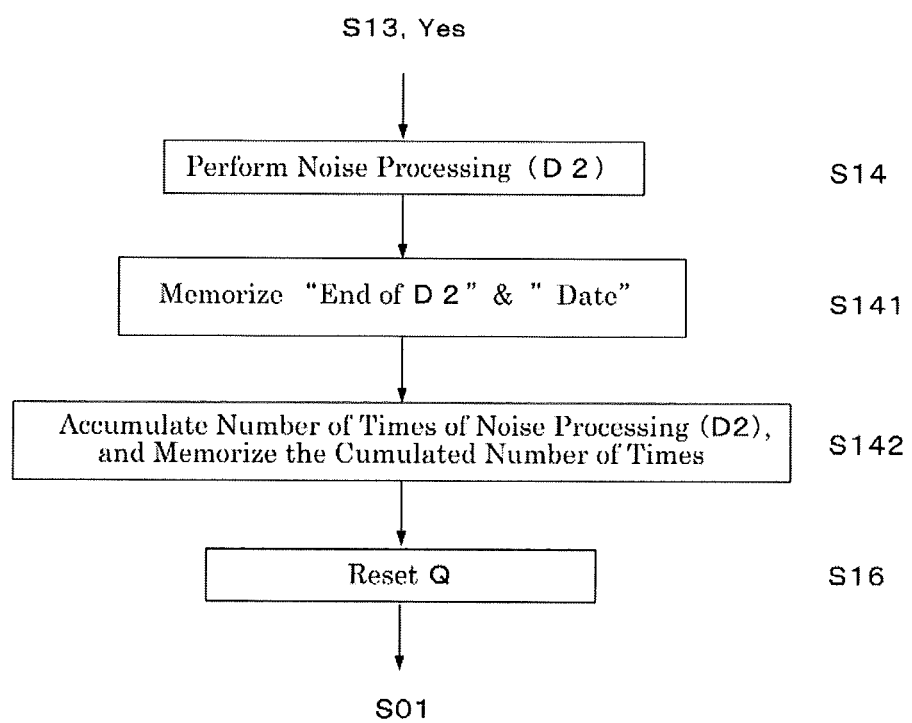
FIG. 17 is a flow chart drawing for explaining the operation in step S142 in the radiation monitoring equipment in accordance with Embodiment 3 of the present invention.
Figure 18:
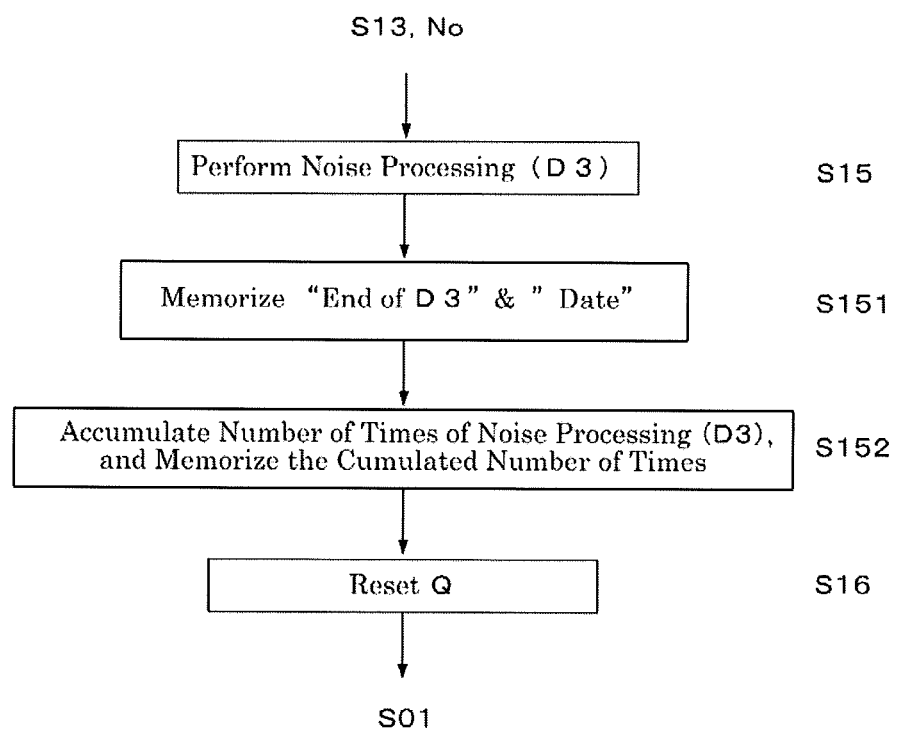
FIG. 18 is a flow chart drawing for explaining the operation in step S152 in the radiation monitoring equipment in accordance with Embodiment 3 of the present invention 3.

A radiation monitoring equipment 100 in accordance with Embodiment 3 is explained based on FIG. 8, FIG. 17 and FIG. 18. The radiation monitoring equipment 100 in accordance with Embodiment 3 operates fundamentally according to the flow chart shown in FIG. 8. It is noted that in Embodiment 3, step S142 is added, as shown in the flow chart of FIG. 17, between step S141 and step S16, which are employed in the flow chart of FIG. 15 of Embodiment 2. In step S142, the number of times of the noise processing (D2) is accumulated, and the cumulated number of times of D2 processing is memorized. Step S152 is similarly added between step S151 and step S16 of the flow chart of FIG. 16, like the flow chart of FIG. 18. In step S152, the number of times of noise processing (D3) is accumulated, and the cumulated number of times of D3 processing is memorized.

It is made to display those memorized contents on the display unit 6 by requesting from the display unit 6. The maintainability of the radiation monitoring equipment further improves, by providing the information about the state of the radiation monitoring equipment.

It is characterized in that the above mentioned noise processing means memorizes the accumulated number of times of the second above mentioned noise processing execution, and the accumulated number of times of the third above mentioned noise processing execution, respectively. Furthermore, the above mentioned engineering value arithmetic processing means displays those accumulated numbers of times by making a request.

Embodiment 4

Figure 19:
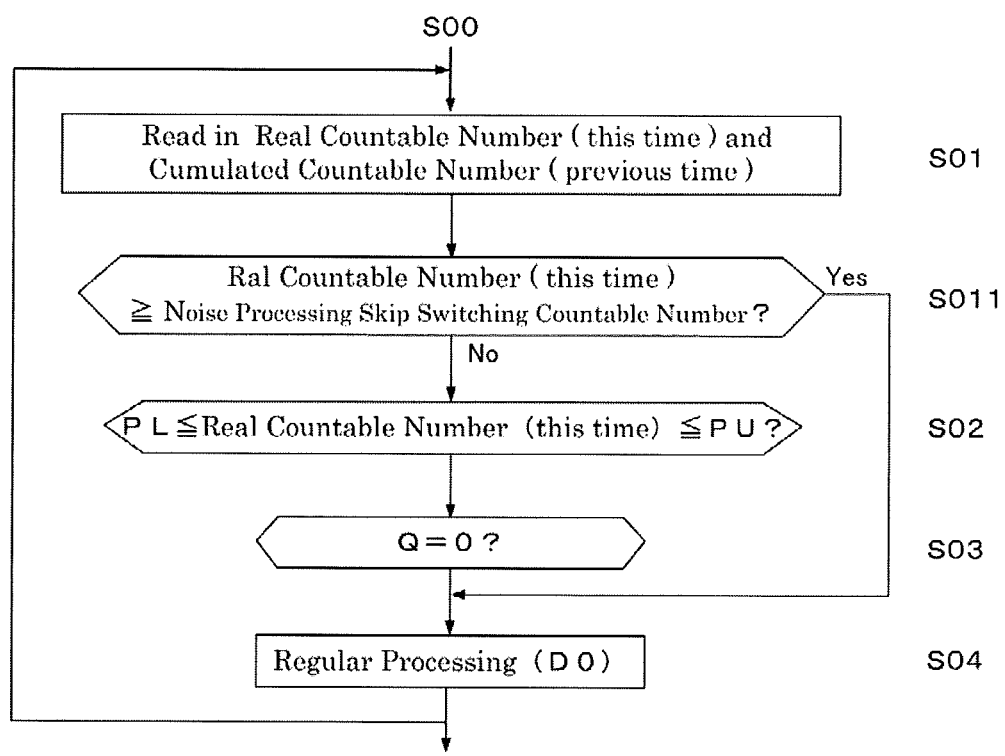
FIG. 19 is a flow chart drawing for explaining the operation of the radiation monitoring equipment in accordance with Embodiment 4 of the present invention.

A radiation monitoring equipment 100 in accordance with Embodiment 4 is explained based on FIG. 8 and FIG. 19. It is noted that in Embodiment 4, step S011 is added between step S01 and step S02, which are employed in Embodiment 1, like the flow chart of FIG. 19. In step S011, it is judged whether real count (this time)≥noise processing skip switching count is satisfied or not. If the judgment of step S011 is No, it is judged that the surroundings of the monitor are in a low radiation state, and the process progresses to step S02. If the judgment of step S011 is Yes, it is judged that the surroundings of the monitor are in a high radiation state and the process progresses to step S04. In step S04, the regular processing (D0) is performed and the process returns to step S01. Therefore, the noise processing means will skip all of the noise processing, if the real count of this time operation cycle exceeds the set-up value (noise processing skip switching count).

In the high radiation state, the noise processing is not expected and the repetition frequency of a saw-tooth wave-like pulse becomes high. The inclination of a saw-tooth wave becomes steep and the situation takes place where the count c (this time) of smaller than 1 count based on a voltage value (voltage data which are digitally converted) can be disregarded.

By skipping the noise processing in the high radiation state, the analog to digital conversion unit 4 can avoid a risk where the timing, at which the conversion unit reads in the output (voltage of a saw-tooth wavelike pulse) of the electric charge integrating part 21, induces malfunction in a noise processing capability. As a result, a highly reliable radiation monitoring equipment is obtained which covers an upper limit of the measurement range.

It should be noted that each embodiment of the present invention may be freely combined, or appropriately modified or omitted within the spirit and scope of the invention.

INDUSTRIAL APPLICABILITY

As mentioned above, this invention is on a radiation monitoring equipment which can control the changes of readings by noise current, by performing a first to third noise processing on the measurement data, where the voltage sudden change by noise current are overlapped on the fundamental wave forms of the saw-tooth wave voltage, based on the current signal from a radiation detector. The radiation monitoring equipment can be used as a radiation monitoring equipment for measuring a dose rate and others in the living space, which are installed around a nuclear power plant, a nuclear fuel reprocessing plant, an institution for radiation application, their affiliated facilities and the like.

EXPLANATION OF NUMERALS AND SYMBOLS

1 Radiation Detector; 2 Current to Voltage and Frequency Conversion Unit; 21 Electric Charge Integrating Part; 211 Capacitor; 212 Operational Amplifier; 22 Voltage Comparison Section; 23 Electric Charge Discharge Section; 231 Constant Current Source; 24 Rectangular Wave Pulse Outputting Part; 3 Calculation Unit; 4 Analog to digital Conversion Unit; 5 Operation Unit; 5a Microprocessor; 51 Real Count Calculation Part; 52 Real Count Memory; 53 Noise Processing Part; 54 Moving Average Counting Rate Calculation Part 5; 55 Engineering Value Conversion Part; 6 Display Unit; 7 Bias Power Supply Unit; 100 Radiation Monitoring equipment; PL Permissible Lower Limit; PU Permissible Upper Limit

What is claimed is:

1. Radiation monitoring equipment comprising:
a radiation detector that detects radiation incident thereon, and outputs a current signal proportional to the radiation;
a first converter device including an operational amplifier and a rectangular wave pulse outputting component, wherein said first converter device is connected to an output side of the radiation detector and (i) converts the current signal outputted from the radiation detector into a voltage signal, and (ii) forms a rectangular wave pulse based on the voltage signal;
a second converter device (i) connected to an output side of the operational amplifier of the first converter device, (ii) that samples the voltage signal converted by the first converter device, and (iii) that outputs a digital voltage data;
a calculator (i) connected to an output side of the rectangular wave pulse outputting component of the first converter device and (ii) that counts a number of rectangular wave pulses formed by the first converter device;
an operation unit (i) connected to an output side of the calculator and that counts the number of rectangular wave pulses outputted by the calculator, (ii) connected to an output side of the second converter device and that counts a cumulated count from the digital voltage data outputted by the second converter device, and (iii)

that obtains a real count from a difference of a current cumulated count at a current operation cycle and a previous cumulated count of a previous operation cycle and memorizing the real count; and a display device that displays operational results executed by the operation unit, wherein
(i) the calculator reads in a real count and a previous cumulated count at every operation cycle,
(ii) the calculator judges whether the real count is within a permissible range,
(iii) upon judging that the real count is within the permissible range, the calculator judges whether a number of times the real count deviated from the permissible range is zero,
(iv) upon judging that the number of times the real count deviated from the permissible range is zero, the calculator performs a regular processing,
(v) upon judging that the real count is out of the permissible range, the calculator adds 1 to the number of times deviated from the permissible range and further judges whether an added number of times deviated from the permissible range is equal to 1,
(vi) upon judging that the added number of times deviated from the permissible range is equal to 1, the calculator memorizes the previous cumulated count as a cumulated count just before the deviation of real count from the permissible range, and further performs a first noise processing,
(vii) upon judging that the added number of times deviated from the permissible range is not equal to 1, the calculator judges whether the added number of times deviated from the permissible range is within a permissible number of times,
(viii) upon judging that the number of times deviated from the permissible range is out of the permissible number of times, the calculator performs the regular processing,
(ix) upon judging that the number of times deviated from the permissible range is within the permissible number of times, the calculator performs the first processing, wherein
(i) the regular processing includes:
a step for calculating a current moving average counting rate from a data row of real counts including the current cumulated count, and
a step for converting the current moving average counting rate into an engineering value and outputting the value, and
(ii) the first noise processing includes a step for outputting an engineering value at the previous operation cycle as an engineering value at the current operation cycle, wherein
(i) upon judging that the number of times deviated from the permissible range is not zero, the operation unit judges whether the number of times deviated from the permissible range is within the permissible number of times,
(ii) upon judging that the number of times deviated from the permissible range is out of the permissible number of times, the operation unit performs the regular processing and further resets the number of times deviated from the permissible range,
(iii) upon judging that the number of times deviated from the permissible range is within the permissible number of times, the operation unit subtracts a cumulated count at an operation cycle just before the first noise processing from the previous cumulated count to find a difference, and divides the difference with the number of times deviated from the permissible range+1 to find a first average real count, and judges whether the first average real count is within the permissible range, and
(iv) upon judging that the first average real count is within the permissible range, the operation unit performs a second noise processing and further resets the number of times deviated from the permissible range, wherein the second noise processing includes:
(i) a step for replacing a real count deviated from the permissible range with the first average real count,
(ii) a step for obtaining a current moving average counting rate based on a data row of real counts after replacement, and
(iii) a step for converting the current moving average counting rate into an engineering value and outputting the value, wherein upon judging that the first average real count is not within the permissible range, the operation unit performs a third noise processing and furthermore resets the number of times deviated from the permissible range, and wherein the third noise processing includes:
(i) a step for obtaining a second average real count by averaging a current real count and a latest real count within the permissible range,
(ii) a step for replacing a real count deviated from the permissible range with the second average real count,
(iii) a step for obtaining a current moving average counting rate based on a data row of real counts after replacement, and
(iv) a step for converting the current moving average counting rate into an engineering value and outputting the value.

2. The radiation monitoring equipment as set forth in claim 1, wherein
upon performing the first noise processing, the operation unit memorizes a start time of the first noise processing,
upon performing the second noise processing, the operation unit memorizes an execution time of the second noise processing, and
upon performing the third noise processing, the operation unit memorizes an execution time of the third noise processing.

3. The radiation monitoring equipment as set forth in claim 2, wherein
the display unit displays the start time of the first noise processing, the execution time of the second noise processing, and the execution time of the third noise processing.

4. The radiation monitoring equipment as set forth in claim 1, wherein
upon performing the second noise processing, the operation unit memorizes a cumulated number of times that the second noise processing is performed, and
upon performing the third noise processing, the operation unit memorizes a cumulated number of times that the third noise processing is performed.

5. The radiation monitoring equipment as set forth in claim 4, wherein the display unit displays the cumulated number of times that the second noise processing is performed, and the cumulated number of times that the third noise processing is performed.

6. The radiation monitoring equipment as set forth in claim 1, wherein
if the current real count exceeds a predetermined value, the operation unit skips the first noise processing, the second noise processing, and the third noise processing.

* * * * *